US012372364B2

(12) United States Patent
Morse et al.

(10) Patent No.: US 12,372,364 B2
(45) Date of Patent: Jul. 29, 2025

(54) SYSTEMS, METHODS, AND STORAGE MEDIA FOR PATH VALIDATION

(71) Applicant: Terrain Scouts LLC, Boise, ID (US)

(72) Inventors: Michael Morse, Boise, ID (US);
Spencer Lee Oldemeyer, Boise, ID (US)

(73) Assignee: Terrain Scouts LLC, Boise, ID (US)

( * ) Notice: Subject to any disclaimer, the term of this patent is extended or adjusted under 35 U.S.C. 154(b) by 187 days.

(21) Appl. No.: 18/070,163

(22) Filed: Nov. 28, 2022

(65) Prior Publication Data

US 2023/0175849 A1 Jun. 8, 2023

Related U.S. Application Data

(60) Provisional application No. 63/285,934, filed on Dec. 3, 2021.

(51) Int. Cl.
*G01C 21/00* (2006.01)
*G01C 21/34* (2006.01)

(52) U.S. Cl.
CPC ..... *G01C 21/3461* (2013.01); *G01C 21/3492* (2013.01); *G01C 21/3874* (2020.08); *G01C 21/3889* (2020.08)

(58) Field of Classification Search
None
See application file for complete search history.

(56) References Cited

U.S. PATENT DOCUMENTS

| 9,709,408 B2 | 7/2017 | Kitchel et al. | |
|---|---|---|---|
| 2016/0113565 A1* | 4/2016 | Lee | G01C 21/3484 701/533 |
| 2019/0325747 A1* | 10/2019 | Fleming | G01C 21/3484 |
| 2021/0048300 A1* | 2/2021 | Saavedra Román | G01C 21/3476 |

* cited by examiner

*Primary Examiner* — James M McPherson
(74) *Attorney, Agent, or Firm* — NOD LAW PC

(57) ABSTRACT

Systems, methods, and storage media for path validation are disclosed. Exemplary implementations may comprise identifying a target path for an activity, including a start and end point, as well as a buffer zone surrounding at least a portion of the target path, receiving a plurality of progressive checkpoints, each intersecting the target path and the buffer zone at one or more points, receiving a plurality of user activity data points associated with the activity, generating a user path corresponding to the plurality of user activity data points, and validating the user path in relation to the target path. In some implementations, the validation is based on determining whether the user path intersects the start and/or end point, a threshold number of progressive checkpoints, and/or whether a portion of user activity data points within the buffer zone is at or above a threshold.

19 Claims, 17 Drawing Sheets

SYSTEMS, METHODS, AND STORAGE MEDIA FOR PATH VALIDATION

CROSS-REFERENCE TO RELATED APPLICATIONS

The present application claims priority to U.S. Provisional Application No. 63/285,934, entitled "Systems, Methods, and Storage Media for Path Validation", the contents of which are incorporated herein by reference in their entirety and for all practical purposes.

FIELD OF THE DISCLOSURE

The present disclosure relates generally to a path validation methodology. In particular, but not by way of limitation, the present disclosure relates to systems, methods, and storage media for validating user activities against geographic tracks or paths.

BACKGROUND

Consumer devices, such as smartphones, smart watches, wearable devices, fitness tracking devices, etc., are often equipped with Global Positioning System (GPS) sensors that are used to record GPS data associated with a user's physical activity. In some cases, a GPS segment or route may be used to represent an activity (e.g., biking, running, hiking, etc.) performed by a user on a geographic track (i.e., a real-world path). In some cases, a user may wish to validate their activity against a segment. One such validation may comprise comparing the user's segment performance against other users who have completed the same segment and verifying that the user has completed the segment. Current segment validation techniques are lacking with respect to their accuracy (e.g., false positives, false negatives, etc.) and are often limited to a single direction and/or a single type of activity (e.g., biking).

The description provided in the background section should not be assumed to be prior art merely because it is mentioned in or associated with the background section. The background section may include information that describes one or more aspects of the subject technology.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below In some aspects, the techniques described herein relate to a system configured for path validation, the system including one or more hardware processors configured by machine-readable instructions to: identify a target path for a user activity, wherein the target path is associated with a plurality of satellite-based radionavigation system data points (e.g., Global Positioning System or GPS data points); identify, for the target path, a start point and an end point; identify a buffer zone, wherein the buffer zone surrounds at least a portion of the target path, and includes or intersects one or more of the start point and the end point; receive, for the target path, a plurality of progressive checkpoints, wherein each of the plurality of progressive checkpoints intersect the target path, and the buffer zone at one or more points; receive, from a user device, a plurality of user activity data points, wherein the user activity data points are associated with a user activity; generate a user path corresponding to the plurality of the user activity data points; validate the user path in relation to the target path, wherein validating the user path includes at least in part, two or more of: determining whether the user path intersects, or is within a threshold distance of, one or more of the start point and the end point, determining whether the user path intersects at least a threshold number of the plurality of progressive checkpoints, and determining, for the user path, whether a portion of user activity data points that are within the buffer zone is at or above a threshold portion of user activity data points; and in response to validating the user path in relation to the target path, recording information pertaining to the validation, wherein the information includes one of a pass and a fail indication, and one or more of: receiving a request for accessing the information pertaining to the validation; and transmitting a message to the user device, wherein the message includes the information pertaining to the validation.

In some aspects, the techniques described herein relate to a system, wherein the one or more hardware processors are further configured by machine-readable instructions to: identify a start line, wherein the start line includes the start point; and identify an end line, wherein the end line includes the end point.

In some aspects, the techniques described herein relate to a system, wherein the one or more hardware processors are further configured by machine-readable instructions to: identify a start circle, wherein the start circle includes at least a portion of the start line, including the start point; identify an end circle; wherein, the end circle includes at least a portion of the end line, including the end point. In some embodiments, each of the start line, the end line, the start circle, and the end circle intersect the buffer zone.

In some aspects, the techniques described herein relate to a system, wherein identifying, for the target path, one or more of the start line, the end line, the start circle, the end circle, the plurality of progressive checkpoints, and the buffer zone includes receiving, from the user device, one or more of: a radius for each of the start circle and the end circle; a length for each of the start line and the end line; a number of the plurality of progressive checkpoints; and a width for the buffer zone.

In some aspects, the techniques described herein relate to a system, wherein the buffer zone is defined by the start line, the end line, a first buffer, and a second buffer. In some aspects, the techniques described herein relate to a system, wherein the first buffer is positioned on one side of the target path, the second buffer is positioned on an opposing side of the target path, and the radius of the start circle is equal to or approximately equal to the radius of the end circle. In some aspects, the techniques described herein relate to a system, wherein the first buffer and the second buffer of the buffer zone are equidistant or roughly equidistant from the target path. In some other cases, the first buffer and the second buffer of the buffer zone are not equidistant from the target path. In other words, the target path may or may not be centered in the buffer zone. In some aspects, the techniques described herein relate to a system, wherein validating the user path in relation to the target path further includes determining whether the user path intersects one or more of the start line, the start circle, the end line, and the end circle.

In some cases, the user path may intersect the buffer zone at a plurality of intersections, including at least a first intersection (e.g., start intersection) corresponding to a first user activity data point of the user path and a second intersection (e.g., end intersection) corresponding to a last user activity data point of the user path. In some other cases, the start intersection may correspond to a user activity data point where the user path crosses or intersects the start circle or the start line. Similarly, the end intersection may correspond to a user activity data point where the user path crosses or intersects the end circle or the end line.

In some aspects, the techniques described herein relate to a system, wherein the plurality of progressive checkpoints are selected based on one or more of the activity and one or more parameters of the target path. In some aspects, the techniques described herein relate to a system, wherein the one or more parameters include one or more of: a length of the target path, a topography of the target path, a net elevation change over the length of the target path, a number of switchbacks over the length of the target path, and a number of other paths that are adjacent or proximate the target path.

In some aspects, the techniques described herein relate to a system, wherein, the target path includes a loop; the start point is located within a start circle; the end point is located within an end circle; and the start circle and the end circle intersect or partially overlap.

In some aspects, the techniques described herein relate to a system, wherein, the user path intersects the buffer zone at one or more intersections, and wherein at least a portion of the user path is outside the buffer zone. In some aspects, the techniques described herein relate to a system, wherein the one or more hardware processors are further configured by machine-readable instructions to identify, for the user path, one or more segments, the one or more segments including at least a first segment extending between a first one of the one or more intersections and one of the start point or the end point; and identify, for each of the one or more segments, a percentage of user activity data points that are within the buffer zone.

In some aspects, the techniques described herein relate to a system, wherein validating the user path in relation to the target path is further based at least in part on determining, for each of the one or more segments, whether a respective percentage of user activity data points that are within the buffer zone is at or above a buffer intersection threshold.

In some aspects, the techniques described herein relate to a system, wherein the target path intersects the buffer zone at a plurality of intersections, and wherein at least a portion of the target path is outside the buffer zone. In some aspects, the techniques described herein relate to a system, wherein the one or more hardware processors are further configured by machine-readable instructions to identify, for the user path, a plurality of segments to be validated in relation to the target path, including at least, a first segment extending between a first intersection and a second intersection of the plurality of intersections, wherein the first intersection includes the start point, a second segment extending between the second intersection and a third intersection of the plurality of intersections, and a third segment extending between the endpoint and one of the third intersection or a fourth intersection of the plurality of intersections. In some aspects, the techniques described herein relate to a system, wherein the one or more hardware processors are further configured by machine-readable instructions to identify, for each segment of the plurality of segments, a percentage of user activity data points that are within the buffer zone.

In some aspects, the techniques described herein relate to a system, wherein at least one segment of the plurality of segments is located between adjacent progressive checkpoints.

In some aspects, the techniques described herein relate to a system, wherein validating the user path in relation to the target path is one of dependent and independent of a direction of the user path.

In some aspects, the techniques described herein relate to a system, wherein the activity is selected from a group consisting of walking, biking, running, hiking, skiing, snowboarding, swimming, rollerblading, horseback riding, jet skiing, snowmobiling, go karting, and skateboarding. It should be noted that other activity types besides the ones listed herein are contemplated in different embodiments. That is, the examples of activities (e.g., walking, running, etc.) described herein and elsewhere throughout the disclosure are not intended to be limiting.

In some aspects, the techniques described herein relate to a method for path validation, the method including: identifying a target path for a user activity, wherein the target path is associated with a plurality of satellite-based radionavigation system data points (e.g., GPS data points); identifying, for the target path, a start point and an end point; identifying a buffer zone, wherein the buffer zone surrounds at least a portion of the target path, and includes or intersects one or more of the start point and the end point; receiving, for the target path, a plurality of progressive checkpoints, wherein each of the plurality of progressive checkpoints intersect the target path, and the buffer zone at one or more points; receiving, from a user device, a plurality of user activity data points, wherein the user activity data points are associated with a user activity; generating a user path corresponding to the plurality of the user activity data points; validating the user path in relation to the target path, wherein validating the user path includes at least in part, two or more of: determining whether the user path intersects, or is within a threshold distance of, one or more of the start point and the end point, determining whether the user path intersects at least a threshold number of the plurality of progressive checkpoints, and determining, for the user path, whether a portion of user activity data points that are within the buffer zone is at or above a threshold portion of user activity data points. In some embodiments, in response to validating the user path in relation to the target path, the method further comprises recording information pertaining to the validation, wherein the information includes one of a pass and a fail indication, and one or more of: receiving a request for accessing the information pertaining to the validation; and transmitting a message to the user device, wherein the message includes the information pertaining to the validation. In some cases, recording information pertaining to the validation comprises storing data/information associated with the user activity (e.g., start and/or end intersection where the user path intersects the buffer zone, start and/or end circles, start and/or end lines; portion of user activity data points that are within the buffer zone, or outside the buffer zone; portion of progressive checkpoints crossed by the user path; locations/points where the user path intersects the buffer zone, to name a few non-limiting examples). In some cases, the information pertaining to the validation is recorded or stored in electronic storage (e.g., electronic storage 1042 of system 1000 in FIG. 10). Additionally, or alternatively, the validation specific information for one or more users may be stored in a cloud-based storage system.

In some aspects, the techniques described herein relate to a method, wherein transmitting the message includes one or more of: transmitting the message to the user device based at least in part on receiving the request for accessing information pertaining to the validation; automatically transmitting one or more of a text message, an email, and a social media message to the user device; and automatically transmitting a push notification to the user device. Some non-limiting examples of user devices include a laptop, a smartphone, a tablet, a desktop computer, and/or a wearable device (e.g., smartwatch).

In some aspects, the techniques described herein relate to a method, further including identifying a start line, wherein the start line includes the start point; and identifying an end line, wherein the end line includes the end point.

In some aspects, the techniques described herein relate to a method, further including identifying a start circle, wherein the start circle includes at least a portion of the start line, including the start point; and identifying an end circle, wherein the end circle includes at least a portion of the end line, including the end point.

In some aspects, the techniques described herein relate to a method, wherein each of the start line, the end line, the start circle, and the end circle intersect the buffer zone.

In some aspects, the techniques described herein relate to a method, wherein identifying, for the target path, one or more of the start line, the end line, the start circle, the end circle, the plurality of progressive checkpoints, and the buffer zone includes receiving, from the user device, one or more of: a radius for each of the start circle and the end circle; a length for each of the start line and the end line; a number of the plurality of progressive checkpoints; and a width for the buffer zone.

In some aspects, the techniques described herein relate to a method, wherein, the buffer zone is defined by the start line, the end line, a first buffer, and a second buffer. In some aspects, the techniques described herein relate to a method, wherein the first buffer is positioned on one side of the target path, the second buffer is positioned on an opposing side of the target path, and the radius of the start circle is equal to or approximately equal to the radius of the end circle. In some aspects, the techniques described herein relate to a method, wherein validating the user path in relation to the target path further includes determining whether the user path intersects one or more of the start line, the start circle, the end line, and the end circle. In some aspects, the techniques described herein relate to a method, wherein the first buffer and the second buffer of the buffer zone are equidistant or roughly equidistant from the target path. In some other cases, the first buffer and the second buffer of the buffer zone are not equidistant from the target path. In other words, the target path may or may not be centered in the buffer zone.

In some aspects, the techniques described herein relate to a method, wherein the user path may intersect the buffer zone at a plurality of intersections, including at least a first intersection (e.g., start intersection) corresponding to a first user activity data point of the user path and a second intersection (e.g., end intersection) corresponding to a last user activity data point of the user path. In some other cases, the start intersection may correspond to a user activity data point where the user path crosses or intersects the start circle or the start line. Similarly, the end intersection may correspond to a user activity data point where the user path crosses or intersects the end circle or the end line.

In some aspects, the techniques described herein relate to a method, wherein the plurality of progressive checkpoints are selected based on one or more of the activity and one or more parameters of the target path; and the one or more parameters include one or more of: a length of the target path, a topography of the target path, a net elevation change over the length of the target path, a number of switchbacks over the length of the target path, and a number of other paths that are adjacent or proximate the target path.

In some aspects, the techniques described herein relate to a method, wherein, the target path includes a loop; the start point is located within a start circle; the end point is located within an end circle; and the start circle and the end circle intersect or partially overlap.

In some aspects, the techniques described herein relate to a method, wherein, the user path intersects the buffer zone at one or more intersections, and wherein at least a portion of the user path is outside the buffer zone, the method further including: identifying, for the user path, one or more segments, the one or more segments including at least a first segment extending between a first one of the one or more intersections and one of the start point or the end point; and identifying, for each of the one or more segments, a percentage of user activity data points that are within the buffer zone.

In some aspects, the techniques described herein relate to a method, wherein validating the user path in relation to the target path is further based at least in part on determining, for each of the one or more segments, whether a respective percentage of user activity data points that are within the buffer zone is at or above a buffer intersection threshold.

In some aspects, the techniques described herein relate to a method, wherein the target path intersects the buffer zone at a plurality of intersections, and wherein at least a portion of the target path is outside the buffer zone, the method further including: identifying, for the user path, a plurality of segments to be validated in relation to the target path, including at least, a first segment extending between a first intersection and a second intersection of the plurality of intersections, wherein the first intersection includes the start point, a second segment extending between the second intersection and a third intersection of the plurality of intersections, and a third segment extending between the endpoint and one of the third intersection or a fourth intersection of the plurality of intersections; and identifying, for each segment of the plurality of segments, a percentage of user activity data points that are within the buffer zone.

In some aspects, the techniques described herein relate to a method, wherein at least one segment of the plurality of segments is located between adjacent progressive checkpoints.

In some aspects, the techniques described herein relate to a method, wherein validating the user path in relation to the target path is one of dependent and independent of a direction of the user path.

In some aspects, the techniques described herein relate to a method, wherein the activity is selected from a group consisting of walking, biking, running, hiking, skiing, snowboarding, swimming, rollerblading, horseback riding, jetskiing, snowmobiling, go karting, and skateboarding. It should be noted that other activity types besides the ones listed herein are contemplated in different embodiments. That is, the examples of activities (e.g., walking, running, etc.) described herein and elsewhere throughout the disclosure are not intended to be limiting.

In some aspects, the techniques described herein relate to a non-transient computer-readable storage medium having instructions embodied thereon, the instructions being executable by one or more processors to perform a method for path validation, the method including: identifying a target path for a user activity, wherein the target path is associated with a plurality of satellite-based radionavigation system data points (e.g., GPS data points); identifying, for the target path, a start point and an end point; identifying a buffer zone, wherein the buffer zone surrounds at least a portion of the target path, and includes or intersects one or more of the start point and the end point; receiving, for the target path, a plurality of progressive checkpoints, wherein each of the plurality of progressive checkpoints intersect the target path, and the buffer zone at one or more points; receiving, from a user device, a plurality of user activity data points, wherein the user activity data points are associated with the user activity; generating a user path corresponding to the plurality of the user activity data points. In some implementations, the method further comprises validating the user path in relation to the target path, wherein validating the user path includes at least in part, two or more of (1) determining whether the user path intersects, or is within a threshold distance of, one or more of the start point and the end point, (2) determining whether the user path intersects at least a threshold number of the plurality of progressive checkpoints, and (3) determining, for the user path, whether a portion of user activity data points that are within the buffer zone is at or above a threshold portion of user activity data points. In some implementations of the non-transient computer-readable storage medium, the method further comprises: in response to validating the user path in relation to the target path, recording (i.e., storing) information pertaining to the validation, wherein the information includes one of a pass and a fail indication, and one or more of: receiving a request for accessing the information pertaining to the validation; and transmitting a message to the user device, wherein the message includes the information pertaining to the validation.

In some aspects, the techniques described herein relate to a non-transient computer-readable storage medium, wherein transmitting the message includes one or more of: transmitting the message to the user device (or another user device associated with the user performing the user activity) based at least in part on receiving the request for accessing information pertaining to the validation; automatically transmitting one or more of a text message, an email, and a social media message to the user device; and automatically transmitting a push notification to the user device (e.g., a push notification for a web app or mobile app installed on, or accessed from, the user device).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
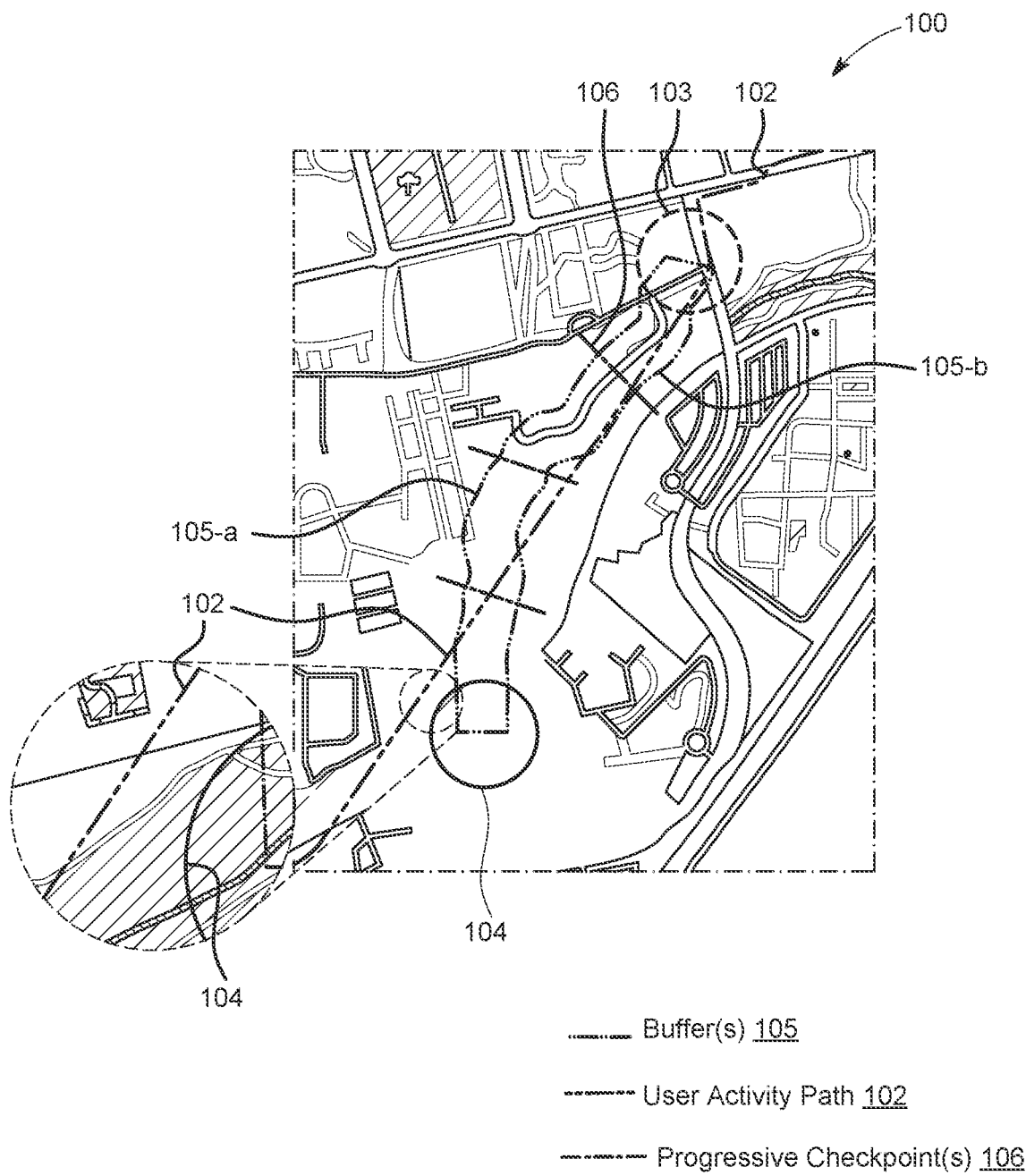
FIG. 1 is an example of a map displayed on a user device and depicting start and end validation of a user path against a target path, according to various aspects of the disclosure.

Preliminary note: the flowcharts and block diagrams in the following Figures illustrate the architecture, functionality, and operation of possible implementations of systems, methods, and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

The words "for example" is used herein to mean "serving as an example, instant, or illustration." Any embodiment described herein as "for example" or any related term is not necessarily to be construed as preferred or advantageous over other embodiments. Additionally, a reference to a "device" is not meant to be limiting to a single such device. It is contemplated that numerous devices may comprise a single "device" as described herein.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are often described in terms, such as comparing, sorting, selecting, or adding, which are commonly associated with mental operations performed by a human operator. It should be understood that these terms are employed to provide a clear description of an embodiment of the present invention, and no such human operator is necessary, nor desirable in most cases.

This requirement for machine implementation for the practical application of the algorithms is understood by those persons of skill in this art as not a duplication of human thought, rather as significantly more than such human capability. Useful machines for performing the operations of one or more embodiments of the present invention include general purpose digital computers or other similar devices. In all cases the distinction between the method operations in operating a computer and the method of computation itself should be recognized. One or more embodiments of present invention relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather as a result of an instruction.

Some embodiments of the present invention rely on an apparatus for performing disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context.

In the description of embodiments herein, frequent use is made of the terms server, client, and client/server architecture. In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that client and server each perform distinct, but complementary functions to accomplish a task or provide a service. The client and server accomplish this by exchanging data, messages, and often state information using a computer network, or multiple networks. It should be appreciated that in a client/server architecture for distributed computing, there are typically multiple servers and multiple clients, and they do not map to each other and further there may be more servers than clients or more clients than servers. A server is typically designed to interact with multiple clients.

In networks, bi-directional data communication (i.e., traffic) occurs through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

The present disclosure relates generally to path validation. More specifically, but without limitation, the present disclosure relates to one or more methodologies for path validation, which may facilitate validating user activities (e.g., running, biking) against geographic tracks or paths.

As used herein, the terms "path" and "segment" may be used interchangeably throughout this disclosure.

As used herein, the terms "geolocation data points", "geolocation points", "satellite-based radionavigation system data points", "Global Positioning System (GPS) data points", or "GPS data points" may be used interchangeably throughout the disclosure.

User devices, such as smartphones, may include a geolocation chip or GPS sensor for tracking a position of the user device (e.g., during navigation), tracking a user's activity, or a combination thereof. As used herein, the term "user activity data points" may be used to refer to satellite-based radionavigation system data points, such as GPS data points, specific to a user activity or effort.

In some cases, a path may refer to a geographic track and may be used to represent a user's activity (e.g., biking, running, cross-country skiing, etc.) on a real-world route. A path may be associated with a plurality of satellite-based radionavigation system data points (e.g., GPS data points) and may include a start point and an endpoint. For instance, a cyclist completing a route (e.g., target path) between location A and location B may use a GPS enabled device, such as a smart phone, to track their activity or effort. In some cases, the path associated with the cycling activity may refer to a user path defined by the GPS data points measured by the GPS enabled device. In some cases, the GPS data points may be overlayed on a digital map (e.g., GOOGLE MAPS provided by Alphabet, Inc., of Mountain View, CA; or BING MAPS provided by Microsoft, Corp., of Redmond, WA) displayed on a user interface of the GPS enabled device. In some cases, the target path may be user defined (e.g., the user may draw a line or route between location A and location B and enter it into the GPS enabled device). Alternatively, the target path associated with the plurality of satellite-based radionavigation system data points may be defined by the system (e.g., system 1000 in FIG. 10) of the present disclosure. In yet other cases, the target path may be determined based on analyzing routes or paths taken by one or more other users and selecting the most traversed path. In some cases, there may be more than one segment or path between two locations A and B. In some other cases, a segment may refer to a path or route between location A and location B, irrespective of user activity, where the segment may be defined by the system (e.g., server 503 in FIG. 5).

In some cases, a user activity may be validated against a target path, which may allow a user to validate their activity/effort against the target path and/or to compare their performance against other users who have completed the same target path, etc. As used herein, the term "target path" refers to a path that a user is attempting to complete, while the term "user path" refers to a path generated by the system (e.g., system 1000) and/or a user device based on monitoring a plurality of user activity data points associated with a user activity. Thus, each of the target path and the user path are associated with a plurality of GPS datapoints. Typically, the target path and associated GPS data points are pre-defined, while the user path is generated based on receiving a plurality of user activity data points (e.g., user activity GPS data points) from a user device associated with the user. To ensure a user has successfully completed the target path, a start point, an end point, and a route corresponding to a plurality of GPS data points may need to be defined between the start and end point. As previously described, current path validation techniques may be limited to a single direction and/or a single type of activity (e.g., biking). In some cases, a user may wish to validate their user activity in a reverse direction, for instance. Alternatively, the user may wish to validate the user path (i.e., in relation to the target path) for multiple types of activities (e.g., both biking and running), which may involve the user downloading multiple apps (e.g., one for biking and one for running). Besides being cumbersome, using multiple apps for different activity types may also lead to discrepancies, since different apps may utilize different methodologies to validate a user activity against a target path. In some cases, an app (e.g., for running) may be more forgiving when a user deviates from the target path (or control line) between the start and end point, while another app (e.g., for biking) may be stricter and may invalidate a user's path due to minor deviations from the control line. Thus, a refined path validation methodology is desired which not only allows validation of multiple types of user activities against target paths (i.e., regardless of the user activity associated with the user path), but also provides validation of a user path regardless of the direction (e.g., forward direction, reverse direction) used to complete the target path.

Figure 2:
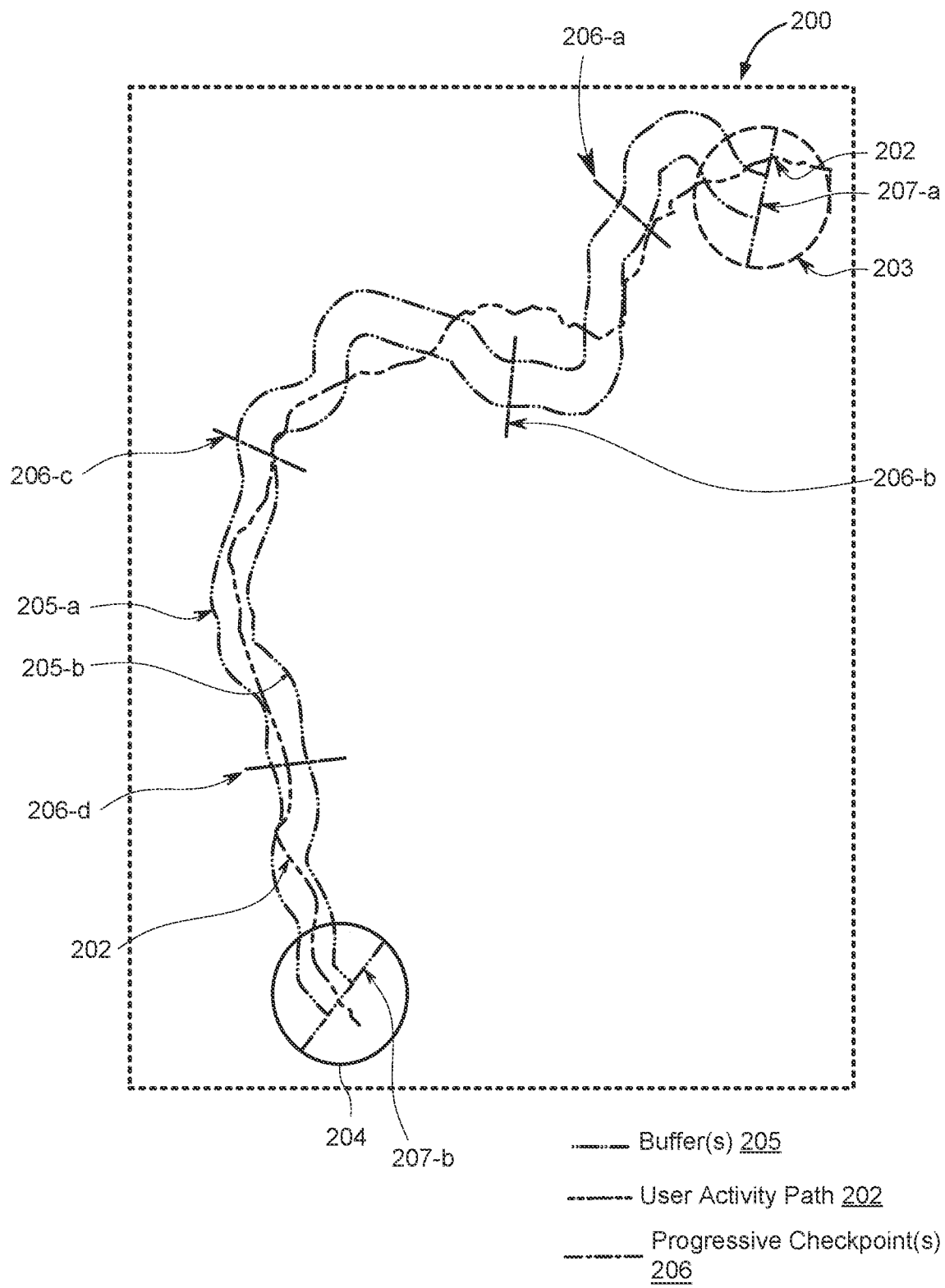
FIG. 2 is an example of a map displayed on a user device and depicting validation of a user's activity against a target path, according to various aspects of the disclosure.

In some cases, the present disclosure enables a user to draw a custom line on a geographic map (e.g., displayed on a GPS enabled user device) and use said line as a target path, further described in relation to FIGS. 1-3. The custom line may comprise a start point, an end point, and a route or path between the start and end points. In some cases, a user path corresponding to a plurality of user activity data points associated with the user's activity may be generated based on recording the plurality of user activity data points (e.g., by a GPS enabled device, such as a smart phone). Furthermore, the user path may be validated in relation to the target path, described in further detail below.

In some embodiments, the user activity may need to pass one or more validation metrics before the user path can be marked as complete (i.e., successfully validated in relation to the target path). Some non-limiting examples of validation metrics that are considered may include start/end line validation, percentage of points contained validation, and progressive checkpoint validation. Other validation metrics are contemplated in different embodiments. In some cases, all validation metrics must pass for the path to be marked as complete. In response to validating the user path in relation to the target path, the system (e.g., system 1000) transmits a message to the user device, where the message includes one of a pass and a fail indication.

In some cases, each validation metric may be associated with one or more variables, where the variables may be customizable by the user. For example, the system (e.g., system 500 in FIG. 5) of the present disclosure may enable the user to define one or more of (1) a buffer zone or buffer outline, including at least a width of the buffer zone, (2) progressive checkpoints, (3) start point and/or end point, (4) start line and/or end line, including at least a respective length of the start and end lines, (5) start circle and/or end circle, including at least a respective radius of the start and end circles, (6) a threshold portion of user activity data points that need to be contained within the buffer zone, where the threshold portion may comprise a number (e.g., 250 data points), a percentage (e.g., >80%), or both (e.g., at least 80% out of a minimum of 250 data points need to be within buffer zone for successful validation), (7) number of progressive checkpoints (e.g., total of 5 progressive checkpoints, or 3 progressive checkpoints per mile), and/or (8) portion of progressive checkpoints (e.g., a number, such as 3 progressive checkpoints, a percentage, such as 80% of progressive checkpoints, etc.) that need to be crossed or intersected by the user path for completion, to name a few non-limiting examples.

In some cases, the buffer zone surrounds at least a portion of the target path and comprises or intersects one or more of the start point and the end point. The buffer zone or outline may include a start line, an end line, a first buffer (e.g., left buffer) positioned on one side of the target path, and a second buffer (e.g., right buffer) positioned on an opposing side of the target path. In some aspects, the buffer zone may be defined by the start line, the end line, the first buffer, and the second buffer. In some embodiments, the system may allow the user to independently specify the first and second buffers, e.g., a respective distance between each of the first and the second buffers from the target path. Alternatively, the user may indicate a single buffer value, which may be used for both the left and the right buffers. In some examples, a larger buffer may be forgiving (i.e., since there is a higher likelihood of a user activity data point being contained within the buffer zone) and vice-versa. Further, the system may allow the user to independently specify the progressive checkpoints, as described below in relation to FIGS. 3A-3B. Additionally or alternatively, the radius of each of the start and end circles may also be customizable by the user, which may allow for smaller or larger start and end circles with regards to the width of the buffer zone.

Figure 5:
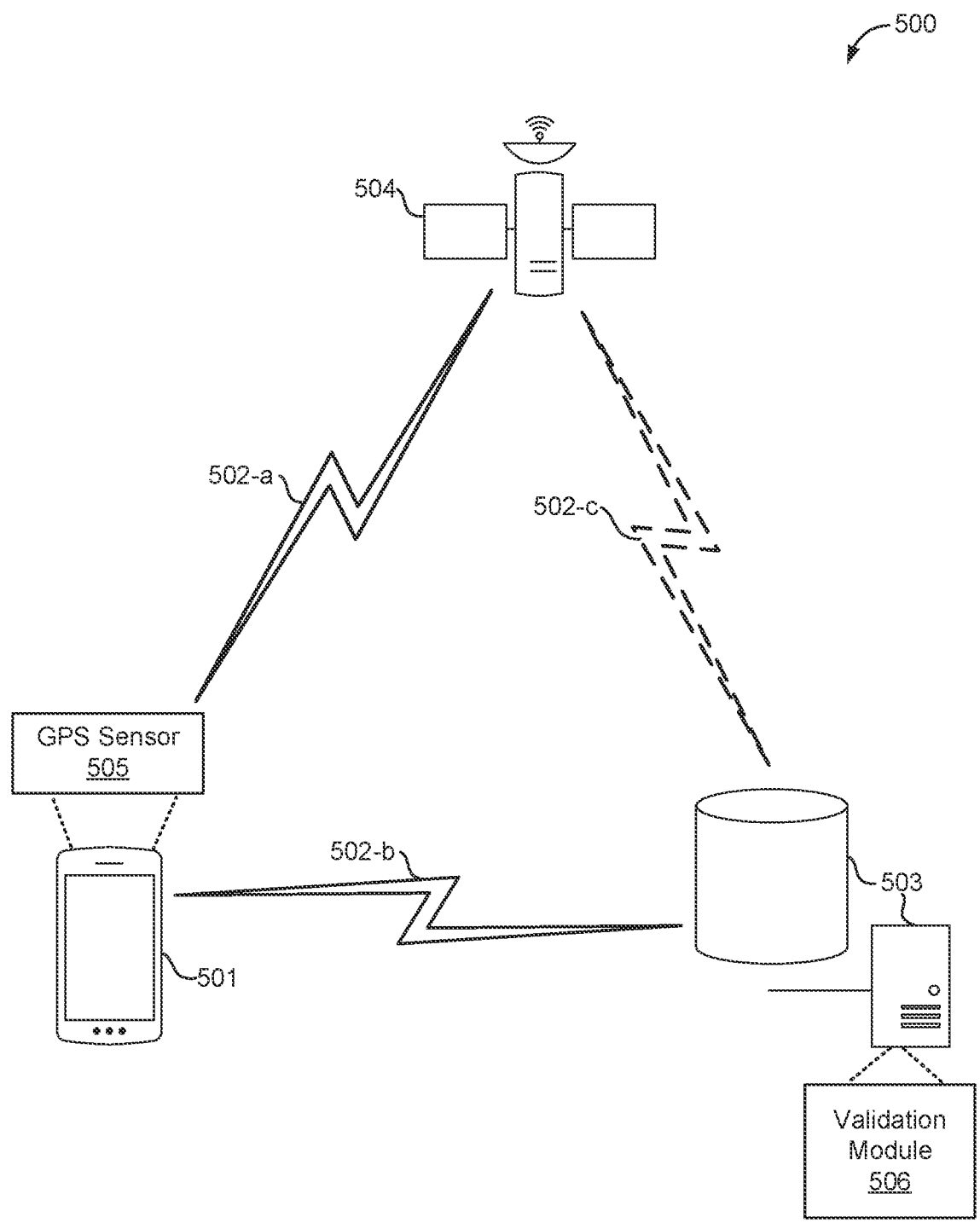
FIG. 5 illustrates an example of a system for path validation, according to various aspects of the disclosure.

Turning now to FIG. 5, which illustrates a schematic diagram of a system 500 configured for path validation, according to various aspects of the present disclosure. System 500 implements one or more aspects of the system 1000 described in relation to FIG. 10, as well as other systems described herein. System 500 comprises a user device 501 (e.g., also shown as remote computing platform 1040 in FIG. 10), a server 503 (e.g., also shown as computing platform 1020 in FIG. 10), a validation module 506 hosted or executed on the server 503, and at least one GPS satellite 504. In some cases, a plurality of GPS satellites 504 may be utilized, which may enable the user device's position to be measured with greater accuracy. As seen, the user device 501 comprising a GPS sensor 505 is in communication with the GPS satellite 504 over communication link 502-*a*, and with the server 503 over communication link 502-*b*. Furthermore, the GPS satellite 504 is in communication with the server 503 over communication link 502-*c*. In some embodiments, the communication link 502-*c* may be optional (e.g., shown as optional by the dashed lines).

In some examples, path validation may be performed at the user device 501, the server 503, or a combination thereof. For instance, the GPS sensor 505 and/or the GPS satellite 504 may measure user activity data points (e.g., GPS data points associated with a user activity) corresponding to the geographical coordinates of the user device 501 and transmit them to the server 503 over communication links 502-*b* and/or 502-*c*, respectively. Other communication options are contemplated for this communication and other communications described herein. The server 503 may receive the user activity data points and generate a user path corresponding to the plurality of user activity data points. Additionally, the server 503 may validate the user path in relation to the target path (e.g., pre-defined by the user), for instance, using the validation module 506. In some examples, the target path may be indicated by a user associated with the user device 501, another user, or generated by the server 503. Following validation, the server 503 may transmit a message (e.g., over communication link 502-*b*, or over communication links 502-*c* and 502-*a*) to the user device 501 indicating one of a pass and a fail. In other cases, the user device 501 may perform path validation without communicating with the server 503. For instance, the user device 501 may measure user activity data points (or GPS data points) corresponding to its real-time position using the GPS sensor 505 and/or the GPS satellite 504 and validate the user path in relation to the target path. In some examples, validating the user activity may be based on at least one of (1) a user input, such as a request, to validate the path, (2) determining that one or more minimum validation metrics are met, and (3) determining that a user's position is at or near the end point. It should be noted that the GPS satellite 504 may or may not relay the GPS data points associated with the user device 501 to server 503. In some cases, the system 500 may refrain from sharing a user's position (i.e., current and/or past geographic coordinates) with the server 503, which may serve to protect the user's privacy.

Turning now to FIG. 1, which illustrates an example of a map 100 displayed on a geolocation capable or GPS enabled device (e.g., shown as user device 501 in FIG. 5), such as a smart phone or wearable device (e.g., fitness tracker, smart watch, etc.), to name a few non-limiting examples. Generally, the map 100 depicts an example of start and end validation of a user activity (shown by user path 102), according to various aspects of the disclosure. FIG. 1 illustrates a start circle 103, an end circle 104, a first buffer 105-a, a second buffer 105-b, and one or more progressive checkpoints 106. In some instances, the start circle 103 and the end circle 104 may comprise a start point and an end point, respectively. For example, the start point, and the end point may be located at or near a center of a respective one of the start and end circles 103 and 104. In some cases, one or more of the start point and the end point may comprise a geographic coordinate, a landmark (e.g., geographic coordinates of a parking lot or a trail head), or any other applicable geographic position. Furthermore, each of the start circle and the end circle may comprise a radius, where the radius of the start circle and the end circle may be the same or different. In some cases, the start circle and the end circle may also comprise a start line and an end line, respectively. The start line may pass through the start point and may be positioned within the start circle. Additionally, the end line may pass through the end point and may be positioned within the end circle. In one non-limiting example, the start line and the end line may be equal to (or substantially equal to, e.g., within 5%) a diameter of the start circle and the end circle, respectively. In some cases, a buffer zone may be defined by the start line, the end line, the first buffer 105-a, and the second buffer 105-b. Additionally, or alternatively, the buffer zone (or buffer outline) may comprise or intersect one or more of the start point and the end point, intersect the start circle and the end circle, or a combination thereof.

While FIG. 1 does not depict the target path, the target path is assumed to run along the center (i.e., equidistant from the first buffer 105-a and the second buffer 105-b) of the buffer zone. In some embodiments, the user path 102 associated with a user activity may need to cross (or intersect) both the start circle 103 and the end circle 104 for validation. Alternatively, the first and last user activity data points (or GPS coordinates) associated with the user activity may need to be contained within the start circle 103 and the end circle 104, respectively, for successful validation of the user path 102. It should be noted that other geometries other than start and end circles, such as, start and end squares, start and end hexagons, an irregular shape, etc., may be utilized in different embodiments and the examples listed herein are not intended to be limiting.

The system (e.g., system 500) may allow the user to set the radii of the start and end circles, for instance, to accommodate sharp turns or corners, switchbacks, hairpin turns, etc. In the example shown, a threshold portion (e.g., >90%) of user activity data points associated with the user path 102 are contained within the buffer zone (i.e., between the first and second buffers 105-a, 105-b), however, the user path 102 fails to cross or intersect the end circle, as well as the end line. In this case, the system may transmit a message to the user device indicating a fail, i.e., the user path 102 was not successfully validated in relation to the target path. It should be noted, however, that extending the radius of the end circle 104 may have enabled the user path 102 to intersect the end circle 104, in which case a checker (e.g., validation module 506 in FIG. 5) would have transmitted a message indicating a pass (or successful validation of the user path 102).

In accordance with aspects of the present disclosure, the system (or validation module) may be configured to validate the user path 102 in one or more of the forward and reverse directions. For instance, in some circumstances, the start and end circles may be switched or reversed. In such cases, as well, the validation module may be configured to validate the path based on determining (1) whether the start and/or end circles are crossed, (2) whether the portion of progressive checkpoints 106 crossed by the user activity path is at or above a progressive checkpoint threshold, and/or (4) whether the portion of user activity data points within the buffer zone is at or above a buffer zone threshold. In other cases, a first user may complete the path in the forward direction (e.g., where the first user's route first crosses start circle 103 then end circle 104), while a second user may complete the path in the reverse direction (i.e., where the second user's route first crosses end circle 104 then start circle 103). In this case, the checker (or validation module) may identify that the two users completed the same path, but in opposite directions. In some embodiments, the checker, such as validation module 506 may be embodied in hardware, software, or a combination thereof. In some examples, the validation module 506 may be hosted or executed on server 503, as shown in FIG. 5. Additionally, or alternatively, the validation module 506 may be one of electronically, logistically, and communicatively coupled with one or more of the server 503, the user device 501, and/or the GPS satellite 504.

FIG. 2 illustrates an example of a map 200 displayed on a user device (e.g., shown as user device 501 in FIG. 5), according to various aspects of the disclosure. The user device may be an example of a geolocation capable (or GPS enabled) user device, such as, but not limited to, a smart phone, a wearable device (e.g., fitness tracking wristband, smart watch, smart glasses, an action camera, such as GOPRO), or any other applicable user device. In some cases, the user device may comprise a display screen (e.g., a touch screen) configured to display a user activity path 202, where the user activity path 202 is generated using a plurality of user activity data points corresponding to a user activity (e.g., hiking, biking). Furthermore, the user activity path 202 may be overlayed on the map 200, as shown in FIG. 2. In some cases, the path validation methodology described in relation to FIG. 2 implements one or more aspects of the other path validation methodologies described herein, including at least the path validation described in relation to FIG. 1.

Map 200 depicts the user activity path 202, a start circle 203, an end circle 204, a buffer zone comprising a first buffer 205-a and a second buffer 205-b, and one or more progressive checkpoints 206 (e.g., first progressive checkpoint 206-a, second progressive checkpoint 206-b, third progressive checkpoint 206-c, and fourth progressive checkpoint 206-d). In this example, the buffer zone is defined by the first buffer 205-a, the second buffer 205-b, a start line 207-a positioned within the start circle 203, and an end line 207-b positioned within the end circle 204. Here, the progressive checkpoints 206 are depicted as straight (or substantially straight) lines. Additionally, the length of each progressive checkpoint 206 (or progressive checkpoint line 206) is greater than the width of the buffer zone, where the width of the buffer zone corresponds to the separation between the first and second buffers 205-a and 205-b. Thus, as seen, each of the start circle 203, end circle 204, and plurality of progressive checkpoints 206 intersect the buffer zone at one or more locations.

In this example, the user activity path 202 (or simply, user path 202) intersects both the start line 207-*a* and the end line 207-*b*. Generally, FIG. 2 relates to validation of the user path 202 (e.g., in relation to a target path, where the target path is within the buffer zone and equidistant from the first and second buffers), where the validation is based on determining the portion of user activity data points (e.g., between start line 207-*a* and end line 207-*b*) that are contained within the buffer zone. In some examples, the system (e.g., system 500 in FIG. 5) may allow the user to enter a threshold (e.g., portion of user activity data points between start and end lines 207-*a*, 207-*b* that should be within the first buffer 205-*a* and second buffer 205-*b*), where the threshold is used to validate the user activity data path. If successfully validated, the system marks the user activity path as complete (pass). Alternatively, the system marks the user activity path as incomplete (fail) if the portion (e.g., percentage or number) of user activity data points within the buffer zone is below the pre-defined threshold.

As noted above, in some cases, the first (e.g., left buffer) and second buffer (e.g., right buffer) values may be the same or different. That is, the first and second buffers 205-*a*, 205-*b* may or may not be equidistant from the target path. In some cases, the user activity path 202 may need to cross or intersect one or more of the start and end circles 203 and 204, respectively, for the user path 202 to be marked as completed. In some other cases, the user activity path 202 may need to cross or intersect both the start and end circles 203 and 204, respectively, for successfully validation. Additionally, or alternatively, the user activity data points (i.e., GPS data points corresponding to the user activity) may be compared to a buffer zone threshold before the user activity path 202 is marked as complete or incomplete. In one non-limiting example, at least 80% of user activity data points may need to be within the first and second buffers before the user activity path 202 can be marked as complete. In another example, at least 80% of user activity data points out of a minimum of 1000 user activity data points may need to be within the first and second buffers before the activity path 202 can be marked as complete. It should be noted that, the example thresholds, percentages, etc., described herein are exemplary only and should not be construed to be limiting.

In some examples, the user may specify multiple percentage threshold values (e.g., buffer zone thresholds) for validating a user activity path in relation to the target path. For example, the system (e.g., system 500 in FIG. 5, system 1000 in FIG. 10) may consider a first buffer zone threshold (e.g., >50% of user activity data points should be within the buffer zone) when the user activity path 202 crosses both the start circle 203 and the end circle 204. Additionally, or alternatively, the system may consider a second buffer zone threshold (e.g., >70% of user activity data points should be within the buffer zone) when the user activity path 202 only crosses one of the start circle 203 and the end circle 204, and when the user activity path 202 is within a threshold distance (e.g., <20 feet, <10 feet, and <2 meters, to name a few) of the non-intersected circle (i.e., start circle or end circle not intersected by the user path). In yet other cases, the system (e.g., system 1000 in FIG. 10) may consider a third buffer zone threshold (e.g., higher than the first and second buffer zone thresholds, for instance, >85%) when the user activity path 202 does not intersect either of the start circle 203 nor the end circle 204, but is within a threshold distance (e.g., <20 feet, <10 feet, and <2 meters, to name a few) of both the start and end circles 203 and 204, respectively.

In the example shown, the user activity path 202 crosses both the start circle 203 and the end circle 204, and the system determines that a first portion (e.g., 56%) of user activity data points corresponding to the user activity path 202 and associated with the user activity (e.g., running) are contained within the buffer zone. In this case, the system (or an instruction module of the system, such as validation module 506 in FIG. 5) compares the buffer zone threshold (e.g., 50%) to the portion (e.g., 56%) of user activity data points that are within the buffer zone to validate the user activity path in relation to the target path. For example, the system transmits a message comprising a "pass" indication to the user device to inform the user that they successfully completed the path/route.

As illustrated in FIG. 2, in some examples, the buffer zone or outline may also be used to define the start and end lines (e.g., start line 207-*a* is positioned to connect the first and second buffers 205-*a* and 205-*b*, respectively, at one end of the buffer zone; and end line 207-*b* is positioned to connect the first and second buffers 205-*a* and 205-*b*, respectively, at an opposing end of the buffer zone).

Figure 3A:
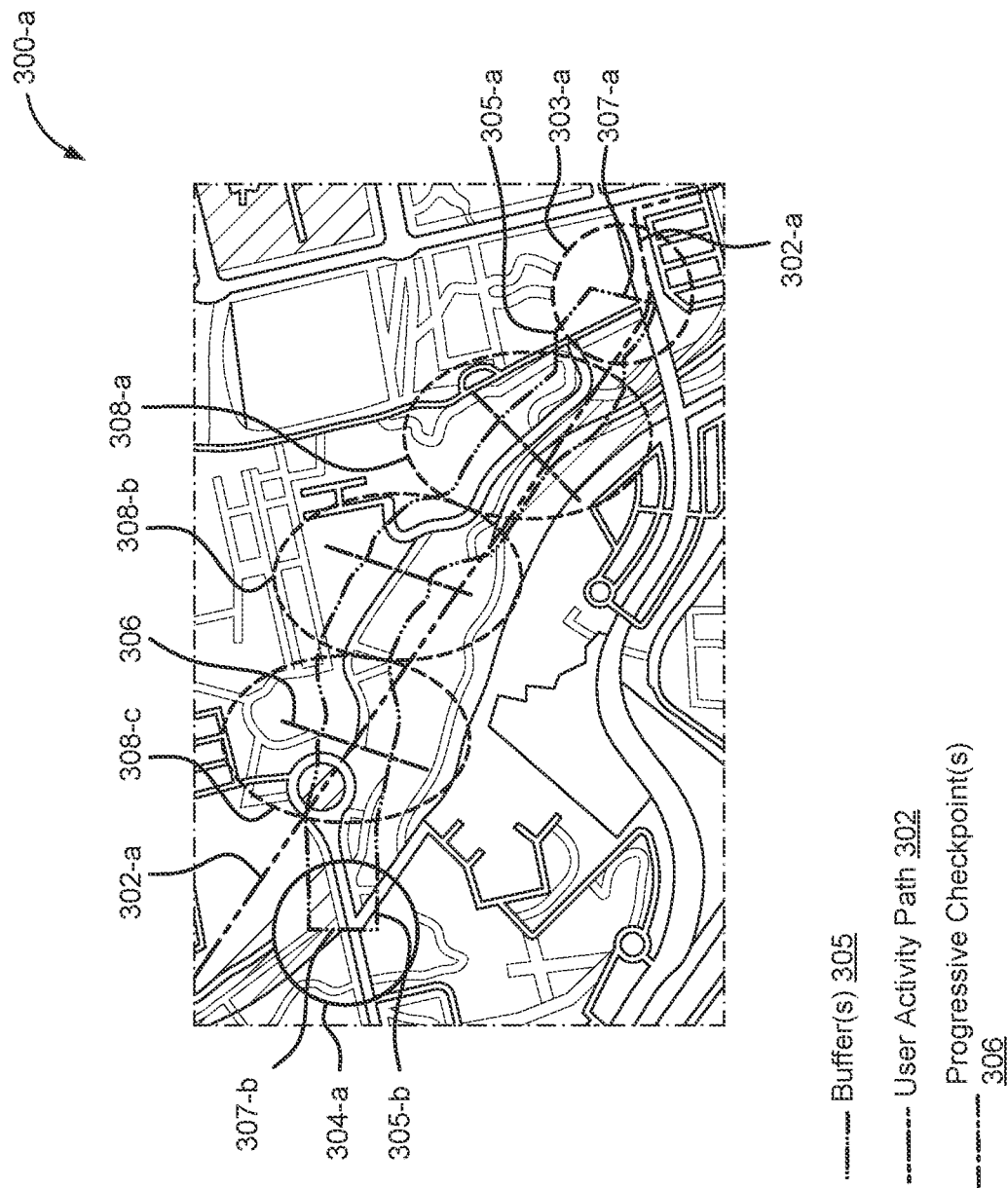
FIGS. 3A illustrates an example of a map displayed on a user device, and depicting progressive checkpoint validation, according to various aspects of the disclosure.

FIG. 3A depicts an example of a map 300-*a* displayed on a user device, according to various aspects of the disclosure. For example, map 300-*a* may be an example of a digital map displayed using a user interface (UI) on a GPS enabled device, such as a smart phone. In some cases, map 300-*a* implements one or more aspects of maps 100 and/or 200 described in relation to FIGS. 1 and/or 2. FIG. 3A generally relates to progressive checkpoint validation.

As shown, FIG. 3A illustrates a user path 302-*a* (e.g., generated using a plurality of user activity data points received from a user device), a start circle 303-*a*, an end circle 304-*a*, first buffer 305-*a*, second buffer 305-*b*, a start line 307-*a*, an end line 307-*b*, a plurality of progressive checkpoint lines 306, and one or more progressive checkpoints 308 (e.g., shown as ellipses, but may take on other shapes in different embodiments). In some cases, each of the progressive checkpoint lines 306 is defined by (or extends between) a first geographic coordinate (or GPS data point) and a second geographic coordinate. Each progressive checkpoint line 306 may be located within one of the plurality of progressive checkpoints 308, as depicted in FIG. 3A. Additionally, the progressive checkpoints 308 and/or progressive checkpoint lines 306 may intersect the buffer zone at one or more locations. For instance, each of the progressive checkpoints 308 (or progressive checkpoint ellipses 308) intersects or crosses the buffer zone at four locations. Furthermore, each of the progressive checkpoint lines 306 intersect the buffer zone at two locations.

In some embodiments, a user may customize the number of progressive checkpoints 308 and/or the required portion (e.g., percentage or number) of progressive checkpoints 308 that must be crossed for the user activity path 302-*a* to be considered complete. Additionally, or alternatively, the user may customize the number of progressive checkpoint lines 306 and/or the required portion (e.g., percentage or number) of progressive checkpoint lines 306 that must be crossed by the user activity path 302-*a* for the user path 302-*a* to be considered complete (i.e., successful validated). In some embodiments, one of the plurality of progressive checkpoints 308 and the plurality of progressive checkpoints lines 306 may be optional. For instance, in some cases, progressive checkpoint lines 306 may be used in lieu of progressive checkpoints 308 for progressive checkpoint validation. In other cases, progressive checkpoints 308 (e.g., progressive checkpoint ellipses or circles) may be used in lieu of progressive checkpoint lines 306 for progressive checkpoint validation.

In the example shown, a plurality of progressive checkpoints 308 (e.g., progressive checkpoint 308-a, progressive checkpoint 308-b, and progressive checkpoint 308-c) are overlayed on the map 300-a, each encompassing a progressive checkpoint line 306. As shown, the progressive checkpoints 308 and/or progressive checkpoint lines 306 extend on either side (up and down in FIG. 3A) of the buffer(s) 305. In some circumstances, the user activity path 302-a associated with the user activity may need to intersect or cross at least a threshold portion (e.g., 2) of the progressive checkpoints 308 (or alternatively, progressive checkpoint lines 306), the start line 307-a, the end line 307-b, the start circle 303-a, and/or the end circle 304-a, for the system to mark the path as completed. In FIG. 3A, the path 302-a crosses/intersects the start circle 303-a and the three progressive checkpoints 308 (or alternatively, the three progressive checkpoint lines 306), but fails to cross both the end circle 304-a and the end line 307-b. Depending on the rigidity (i.e., minimum criteria) indicated by the user, the system may mark the user activity path as complete (e.g., transmit a message including a pass indication) or incomplete (e.g., transmit a message including a fail indication). In one non-limiting example, the system may mark the user activity path as incomplete based on determining that the user activity path 302-a fails to cross one or more of the end circle 304-a and the end line 307-b.

Figure 3C:
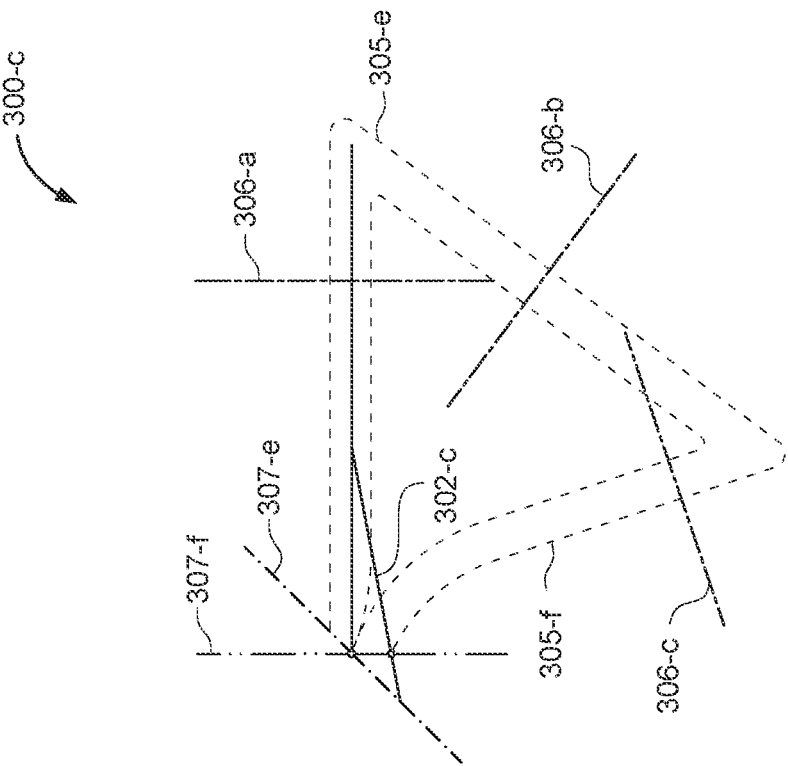
FIG. 3C illustrates an example of a map displayed on a user device depicting progressive checkpoint validation, according to various aspects of the disclosure.
Figure 3B:
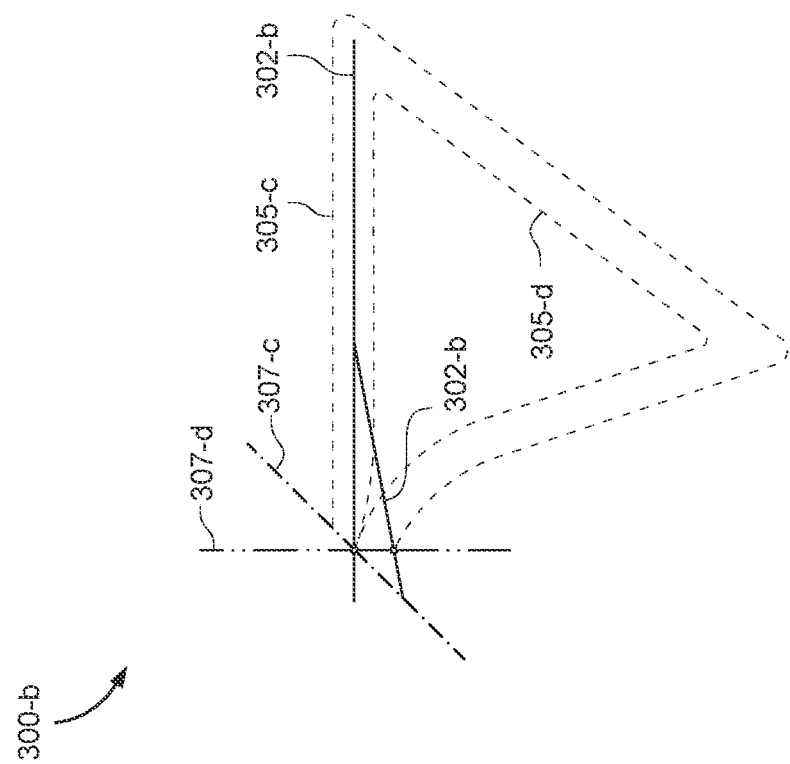
FIG. 3B illustrates an example of a map displayed on a user device and depicting path validation without progressive checkpoint validation.

FIG. 3B illustrates an example of a map 300-b depicting a scenario where a user activity path 302-b may be marked as complete (false positive) when a prior art path validation methodology is utilized. Additionally, FIG. 3C illustrates an example of a map 300-c for an identical or substantially identical scenario as the one in FIG. 3B, with the difference being the use of progressive checkpoint validation, according to an embodiment of the disclosure. In the latter case, the system (e.g., system 500 in FIG. 5, system 1000 in FIG. 10) of the present disclosure correctly identifies the user activity path 302-c as being incomplete, further described below.

In some circumstances, path validation techniques used in the prior art may incorrectly validate a user activity path 302-b in relation to a target path due to the start and end lines being in close proximity (e.g., intersecting, or being within a threshold distance from each other). In FIG. 3B, the target path (not shown) may be positioned within a buffer zone, where the buffer zone is defined by a start line 307-c, an end line 307-d, a first buffer 305-c, and a second buffer 305-d. As seen, the start line 307-c and the end line 307-d are in close proximity to each other (or intersect each other). Furthermore, the user activity path 302-b intersects, or crosses, both the start line 307-c and end line 307-d but fails to closely follow the target path (e.g., based on portion of user activity data points contained within the buffer zone). For instance, the user activity path 302-b only covers about a third of the length of the buffer zone. In some circumstances, a prior art path validation technique may mark the user activity path 302-b as complete (false positive) based on determining that the user activity path 302-b crosses/intersects both the start and end lines.

Further, FIG. 3C relates to validation of a path based on a plurality of validation metrics, for instance, two or more of start/end line validation, buffer zone validation, and progressive checkpoint validation, further described below.

FIG. 3C illustrates a path 302-c, a start line 307-e, an end line 307-f, a first buffer 305-e, and a second buffer 305-f, which may be similar or substantially similar to the corresponding ones described in relation to FIG. 3B. Additionally, FIG. 3C also illustrates a plurality of progressive checkpoint lines 306 (e.g., first progressive checkpoint line 306-a, second progressive checkpoint line 306-b, and third progressive checkpoint 306-c) positioned along the length of the buffer zone and intersecting each of the first buffer 305-e and the second buffer 305-f at one or more locations. As seen, the user activity path 302-c intersects both the start line 307-e and the end line 307-f, but only intersects the first progressive checkpoint line 306-a. In this case, in addition to determining whether the user activity path 302-c crosses the start/end lines, the system may also determine whether the portion of progressive checkpoint lines crossed by the user path is at or above a threshold (e.g., a percentage, such as 100%; a number, such as 2) and/or whether the portion of user activity data points that are within the buffer zone is at or above a buffer zone threshold (e.g., percentage, a number, or both).

In some circumstances, without progressive checkpoint validation and/or validating the portion of user activity data points contained within the buffer zone, the user activity path 302-b may be marked as complete (i.e., false positive), for instance, based on the percentage of points contained within the buffers 305-c and 305-d alone and/or the path 302-b intersecting both the start and end lines. However, by validating two or more of start/end line validation, buffer zone validation, and progressive checkpoint validation, a checker (e.g., validation module) of the system may determine that the path is incomplete (i.e., a fail).

In some examples, the width of the progressive checkpoint lines 306 may be the same or substantially the same as the width of the start and/or end lines. In some examples, the width of the start and end lines may be the same or different. Furthermore, in some cases, the width of one or more of the progressive checkpoint lines, start line, and end line may be user defined.

Thus, as described in relation to FIG. 3C, validation of a user path in relation to a target path may include multiple validation metrics, including start/end line validation, buffer zone validation, and progressive checkpoint validation. As previously described, the validation metrics may be customizable by the user. For instance, the buffer zone surrounding the target path may be customizable by indicating a respective distance for each of the first and the second buffer from the target path. The distance of the target path from each of the first and the second buffer may or may not be constant over the length of the target path. Additionally, or alternatively, the user may also specify a buffer zone threshold, corresponding to the portion of user activity data points that need to be within the buffer zone for the user activity path to be marked as complete. In some cases, the buffer zone threshold may comprise a percentage (e.g., 70%, 80%, etc.,), a number (e.g., 250, 500, etc.), or both (e.g., 80% and 300 data points). In some cases, the user may also specify a progressive checkpoint threshold (e.g., number, percentage) corresponding to the portion of progressive checkpoints that must be intersected by the user activity path for successful validation. In other cases, the system (e.g., system 500) may suggest a respective threshold for one or more of the progressive checkpoint validation and the buffer zone validation based on analyzing one or more of: the length of the target path or route, the topography (e.g., total or net elevation change for target path, ratio of net elevation change with respect to length of target path), number of sharp corners (e.g., hairpin turns, as may be determined by angle or degrees of turn), number of other paths (if any) that are adjacent or proximate the target path (e.g., within 100 feet, within a quarter of a mile), number of paths close to roads (if any), switchbacks (if any) over the length of the target path, and/or backtracking (if any) over the length of the target path, to name a few non-limiting examples. Thus, the present disclosure enables a plurality of activity types (e.g., biking, running, skateboarding, etc.) to be checked or validated against one or more target paths, regardless of direction. Further, the system allows a user to customize the criteria/metrics used for path validation as forgiving (or unforgiving) as necessary by customizing the buffer size (e.g., width of the buffer zone), start/end circle radii, number of progressive checkpoints, etc.

Figure 3D:
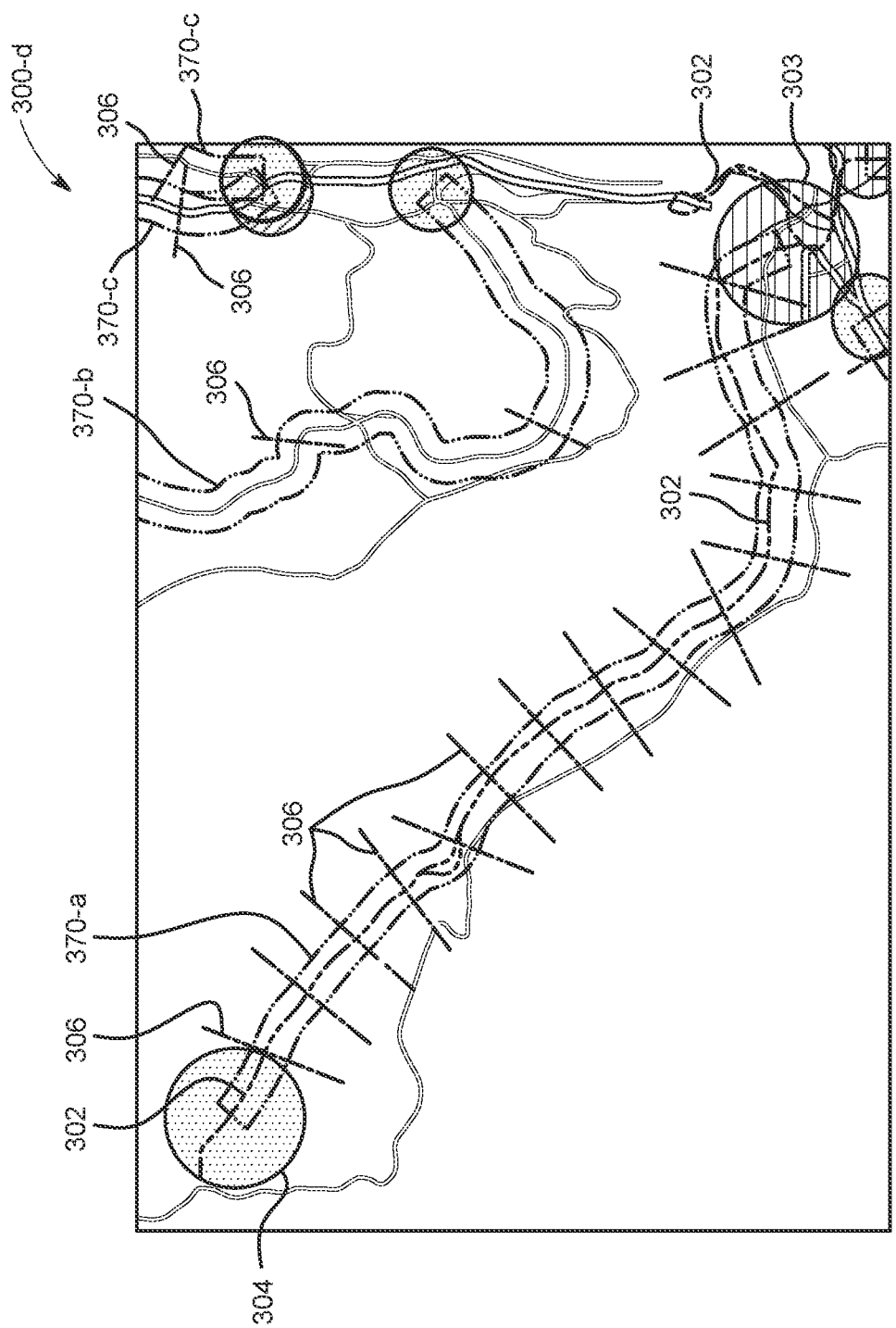
FIG. 3D illustrates an example of a map displayed on a user device, and depicting progressive checkpoint validation, according to various aspects of the disclosure.

FIG. 3D illustrates another example of a map 300-d displayed on a user device (e.g., a GPS enabled user device, such as a smartphone), according to various aspects of the disclosure. Map 300-d implements one or more aspects of the maps described herein, and comprises a plurality of buffer zones 370 (e.g., buffer zone 370-a, buffer zone 370-b, buffer zone 370-c) each surrounding at least a portion of a target path. Each of the target paths (e.g., shown as target path 783 in FIG. 7) may be positioned along a centerline of a corresponding buffer zone. Additionally, map 300-d also shows a plurality of progressive checkpoints 306, and one or more of a start circle 303, and an end circle 304, intersecting each of the plurality of buffer zones 370. In some cases, the start circle 303 and end circle 304 associated with a target path (e.g., of buffer zone 370-c) may intersect or partially overlap. Additionally, or alternatively, a start circle and an end circle for another target path may be positioned at or near an end circle of a target path (e.g., the start circle 303 intersecting buffer zone 370-a is positioned at or near the start and end circles of another target path, shown near the bottom left of the map 300-d). Map 300-d also depicts a user path 302 (or user activity path 302) traversing through/along the buffer zone 370-a, where the user path 302 intersects or crosses both the start circle 303 and the end circle 304 (i.e., intersecting the buffer zone 370-a), as well as a plurality of progressive checkpoint 306 intersecting the buffer zone 370-a.

In some circumstances, a user may not enter a path (e.g., a loop) where expected. For instance, a hiking or biking loop may have different entry points (e.g., trail heads) and a user may start from a different entry point than the one expected by the system, the one typically entered by other users, etc. In some instances, aspects of the present disclosure are directed to a direction independent path validation technique. Specifically, the present disclosure may support path validation irrespective of the direction (e.g., forward direction, reverse direction) of the user activity, which helps prevent false fails for some paths, such as loops. To alleviate the possibility of false fails, provided herein is a buffer intersection validation methodology.

In some cases, the user path intersects the buffer zone at one or more intersections, where at least a portion of the user path is outside the buffer zone. In such cases, the system (e.g., system 500, system 1000) of the present disclosure may consider at least a portion of the intersections or locations where the user path crosses the buffer zone for validating the user path in relation to the target path, further described below. Additionally, in the case that the first or last GPS coordinate (i.e., first or last user activity data point) are contained within the buffer zone, the system may treat those GPS coordinates as intersections.

Figure 6A:
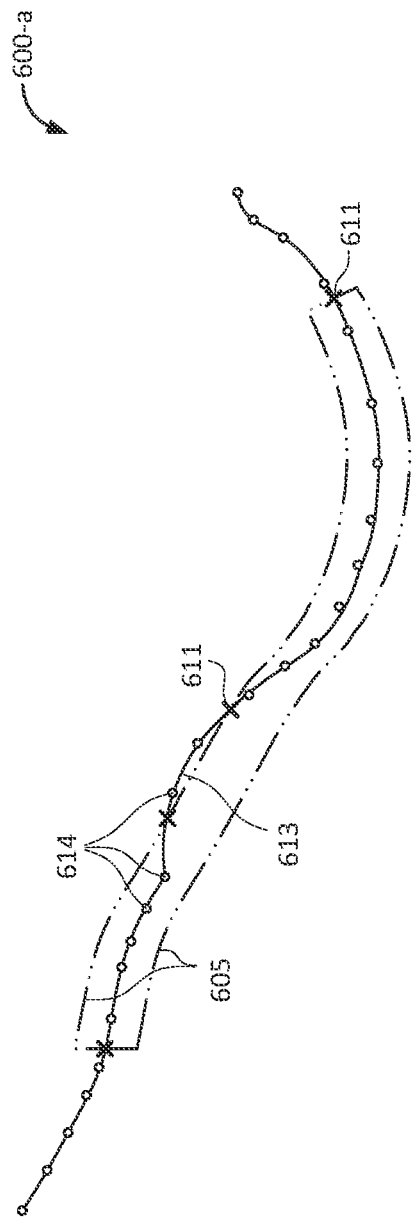
FIG. 6A illustrates an example of a map displayed on a user device, and depicting buffer intersection validation, according to various aspects of the disclosure.
Figure 6B:
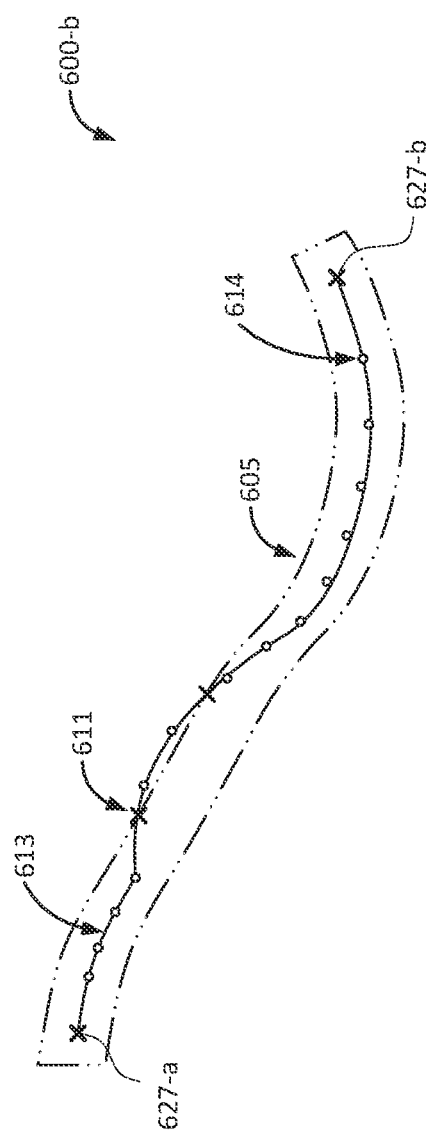
FIG. 6B illustrates an example of a map displayed on a user device, and depicting buffer intersection validation, according to various aspects of the disclosure.

Turning now to FIGS. 6A-B, which depict examples of buffer intersection validation, in accordance with one or more implementations.

FIG. 6A illustrates an example of a map 600-a displayed on a user device and depicting buffer intersection validation, according to various aspects of the disclosure. As seen, FIG. 6A shows buffers 605, a user path 613 (or GPS path 613) defined by a plurality of user activity data points 614, and one or more intersections 611 where the user path 613 intersects the buffer zone. As noted above, the buffer zone is defined by the buffer(s) 605, a start line, and an end line. Additionally, the buffer zone surrounds at least a portion of the target path. For instance, the target path may correspond to a center-line of the buffer zone, in some embodiments. In this example, the user path 613 intersects the buffer zone at four (4) intersections 611, each shown by an "X" in FIG. 6A. In this example, the system may consider all four intersections 611 where the user path 613 crosses the buffer zone as the intersections to validate.

FIG. 6B illustrates an example of a map 600-b (e.g., displayed on a GPS enabled user device) depicting buffer intersection validation, according to various aspects of the disclosure. Map 600-b is similar or substantially similar to the map 600-a described in relation to FIG. 6A. Here, map 600-b depicts a scenario where the first and last user activity data points 627-a and 627-b, respectively, are contained within the buffer zone. In this example, the system may consider the user activity data points 627-a and 627-b as intersections (shown by an "X") to validate.

Figure 7:
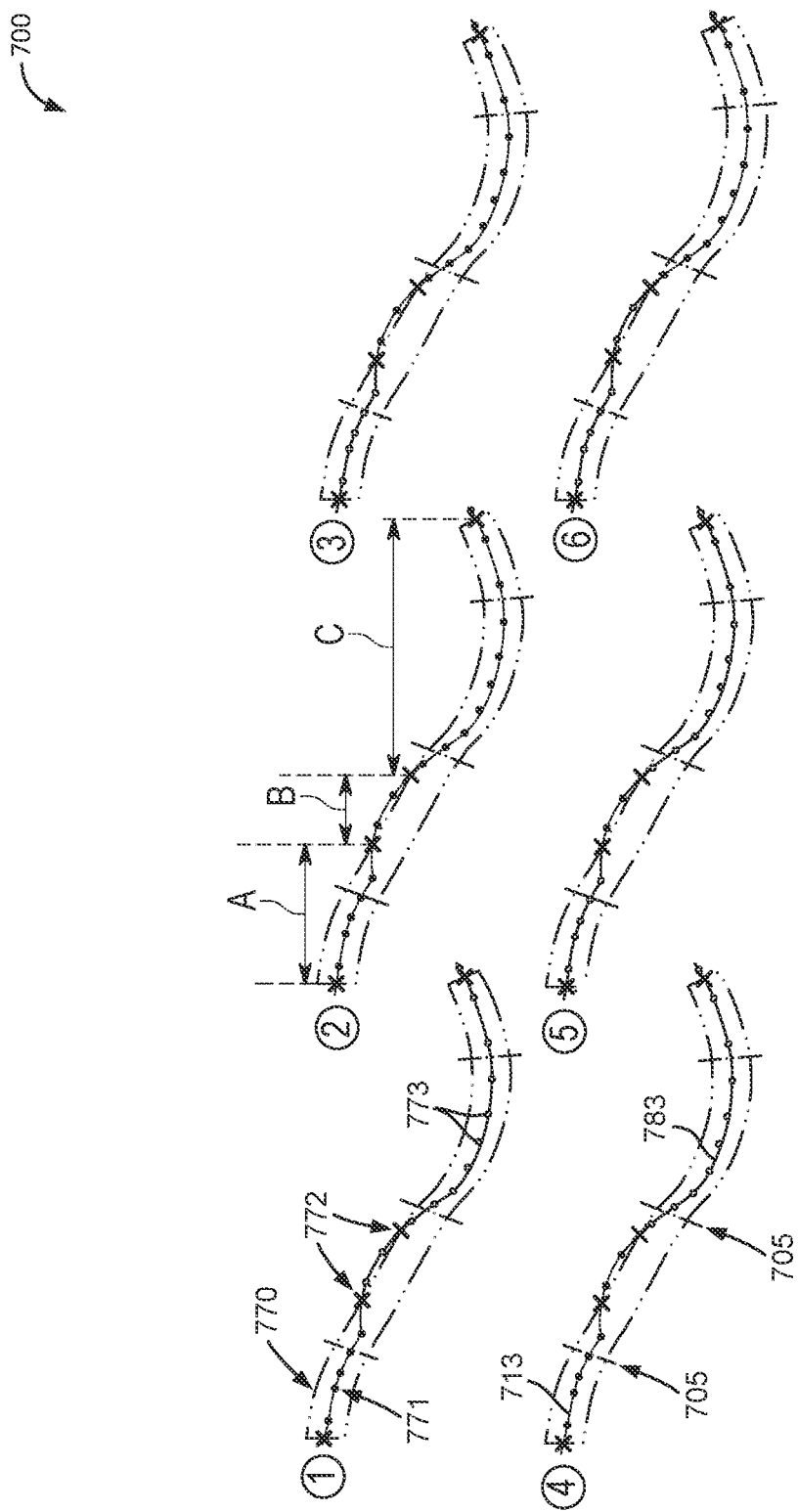
FIG. 7 depicts buffer intersection validation for a plurality of paths or line segments, according to various aspects of the disclosure.

FIG. 7 depicts buffer intersection validation 700 for various example scenarios, in accordance with one or more implementations. FIG. 7 depicts six example scenarios, labeled 1 through 6, shown by way of maps. Further, each map 1-6 depicts validation of a user path 713 in relation to a target path 783 when at least a portion of the target path is outside the buffer zone 770. In maps 1-6, the target path 783 and the buffer zone 770 are identical (or substantially identical), while the user path 713 are different. In FIG. 7, each user path 713 in maps 1-6 corresponds to a plurality of user activity data points 771 (shown as black circles), and each target path 783 corresponds to a plurality of GPS data points 773 (shown as white circles). Additionally, in FIG. 7, the user path 713 is overlayed on the target path 783. Thus, it should be understood that the depiction of GPS data points 773 (i.e., white circles) in FIG. 7 implies that no user activity data points 771 were received for the corresponding GPS data points 773. For instance, map (2) does not depict any white circles, implying that the user activity data points 771 (i.e., associated with the user path 713) closely followed the GPS data points 773 (i.e., associated with the target path 783). The maps 1-6 in FIG. 7 also show a plurality of progressive checkpoint lines 705 intersecting the buffer zone 770.

In some examples, path validation may comprise validating the portion of progressive checkpoint lines 705 crossed by the user path 713 with respect to a threshold (e.g., a percentage, such as 90%; a number, such as 3) and/or the portion (e.g., percentage, or a number) of user activity data points 771 contained with the buffer zone 770. In FIG. 7, the target path 783 intersects the buffer zone 770 at a plurality of intersections 772, where at least a portion of the target path 783 is outside the buffer zone 770. In such cases, the system may identify a first segment (shown as segment A) extending between a first intersection and a second intersection of the plurality of intersections 772, where the first intersection comprises the start point. The system may also identify a second segment (shown as segment B) extending between the second intersection and a third intersection of the plurality of intersections, and a third segment (shown as segment C) extending between the endpoint and the third intersection of the plurality of intersections. In this example, path validation comprises validating the plurality of segments (e.g., segments A, B, C) in relation to the target path 783. For example, the system may identify, for each segment of the plurality of segments, a percentage of user activity data points 771 that are within the buffer zone 770. In this example, the system may check all segments (e.g., segments A, B, C) between intersections 772 and compare the percentage of user activity data points 771 that are within the buffer zone 770 for each segment to a threshold. Here, map (2) comprises a user path 713 that passes validation as the user path 713 intersects all of the progressive checkpoint lines 705, matches or substantially matches the target path 783 (e.g., based on comparing the user activity data points 771 to the GPS data points 783 for the target path 783), and/or satisfies the threshold for the portion of user activity data points 771 that need to be within the buffer zone (e.g., for each segment A, B, and C). Further, the user paths 713 shown in maps (1), (3), (4), (5), and (6) fail path validation since each of their segments (e.g., A, B, C) between intersections 772 fail to pass the validation metrics. For instance, user paths 713 in maps (1), (4), (5) fail to cross a threshold number (e.g., 2) of progressive checkpoint lines 705. Further, user paths 713 in maps (3) and (6) fail to satisfy a threshold number of user activity data points 771 that need to be within the buffer zone 770 between the first and second intersections (from the left).

In some examples, the system of the present disclosure may determine which of the buffer intersection validation (i.e., as described in relation to at least FIGS. 6A, 6B, and/or 7), progressive checkpoint validation (i.e., as described in relation to at least FIGS. 3A and 3C), and/or the start/end line validation (i.e., as described in relation to at least FIGS. 1-3C) may be more appropriate for validating a user path in relation to a target path, for instance, based on the attributes of the target path (e.g., is target path a loop, does target path have more than one possible entry point, etc.). In some cases, this determination may be done when the target path is created. In some other cases, the system may validate different sections of the user path in relation to the target path using different methodologies. One non-limiting example of a scenario where both the buffer intersection validation and the start/end validation techniques may be employed, albeit not simultaneously, includes a single trails challenge.

Figure 8:
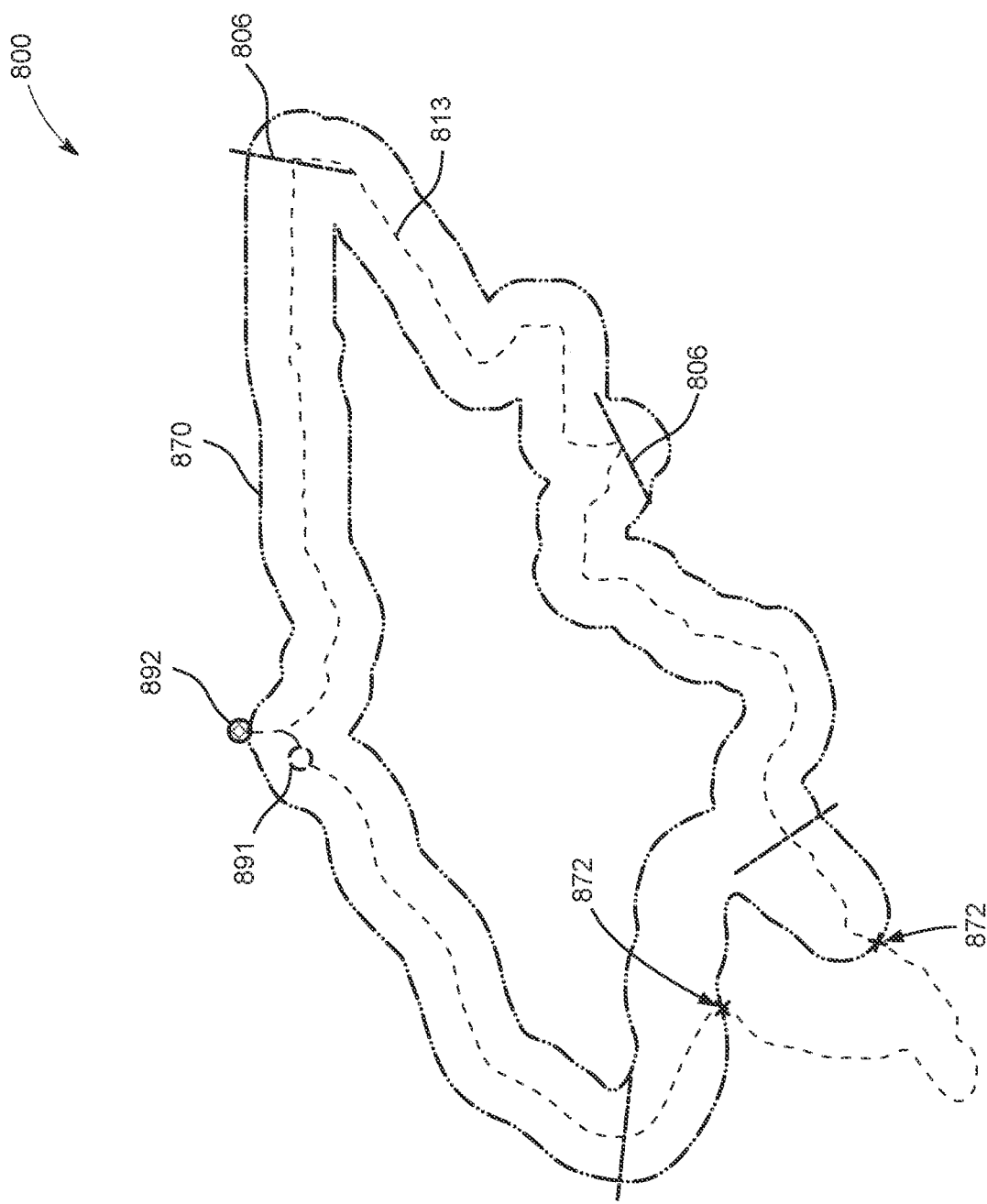
FIG. 8 illustrates an example of a map displayed on a user device, and depicting buffer intersection validation, according to various aspects of the disclosure.

FIG. 8 illustrates an example of a map 800 (e.g., displayed on a user device) depicting buffer intersection validation, according to various aspects of the disclosure. Map 800 comprises a start point 891, an end point 892, a buffer zone 870, and a plurality of progressive checkpoint lines 806 along the length of (and intersecting) the buffer zone 870. In some cases, the buffer zone 870 surrounds at least a portion of a target path, as described herein and elsewhere throughout the disclosure. FIG. 8 also shows a user path 813, where the user path 813 starts at the start point 891 and ends at the end point 892. Additionally, or alternatively, the target path starts at the start point 891 and ends at the end point 892. As seen, the user path 813 intersects the buffer zone 870 at a plurality of intersections. For instance, the user path 813 intersects the buffer zone 870 at two intersections 872 (e.g., towards the bottom left of the map 800) and once near the end point 892. In some cases, an intersection may also comprise one of a start point and an end point, for instance, if the start point and/or the end point is within the buffer zone 870. In this example, the start point 891 may be an example of an intersection (i.e., of the user path 813 with the buffer zone 870) since it lies within the buffer zone 870.

In some cases, the user path 813 may be validated in relation to the target path (e.g., centerline of the buffer zone 870), where validating the user path comprises at least in part, two or more of: (1) determining whether the user path 813 intersects, or is within a threshold distance of, one or more of the start point 891 and the end point 892, (2) determining whether the user path 813 intersects at least a threshold number of the plurality of progressive checkpoint lines 806, and (3) determining, for the user path 813, whether a portion of user activity data points (i.e., corresponding to the user 813) that are within the buffer zone 870 is at or above a threshold portion of user activity data points. Additionally, or alternatively, validating the user path 813 in relation to the target path (e.g., centerline of buffer zone 870) may comprise the buffer intersection validation methodology described above in relation to FIG. 7.

Figure 9:
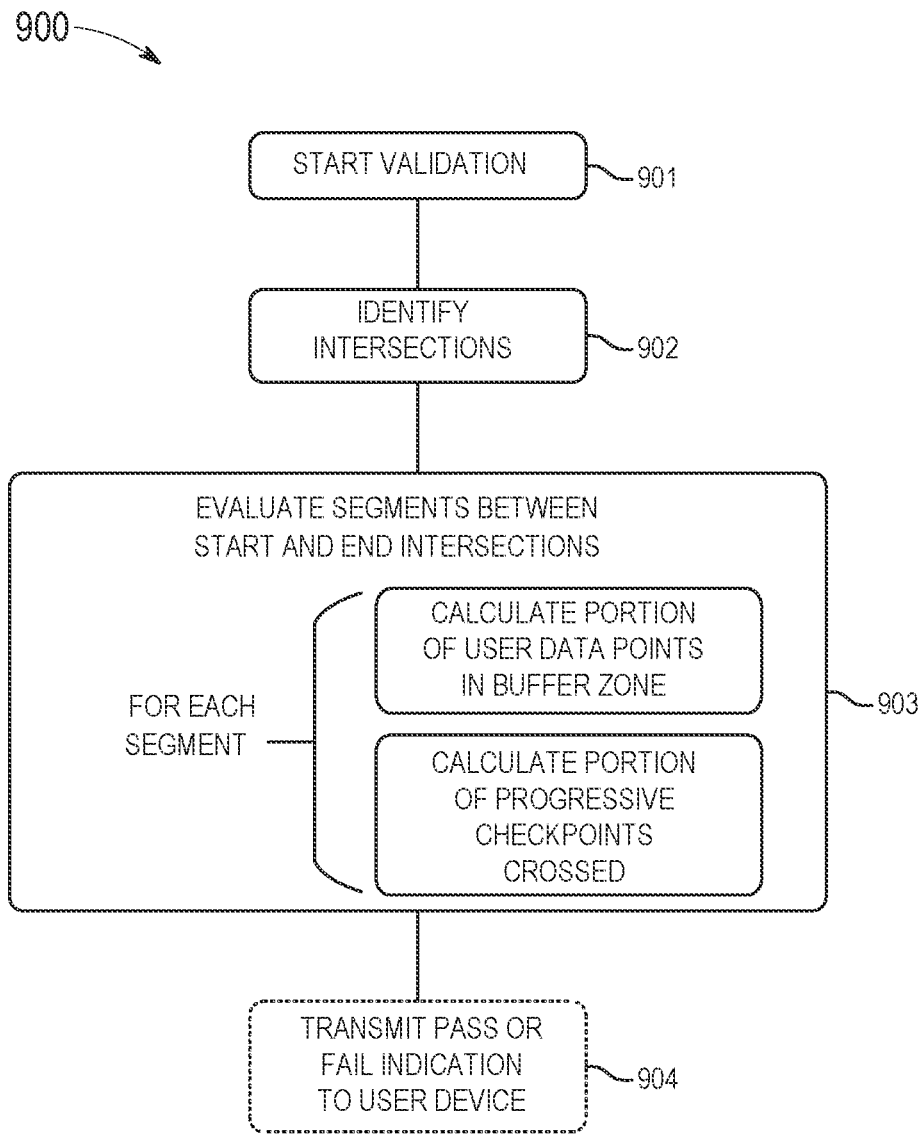
FIG. 9 illustrates an example of a flowchart directed to a method for path validation method, according to various aspects of the disclosure.

FIG. 9 illustrates an example of a flowchart 900 directed to a method for path validation, in accordance with one or more implementations.

At Block 901, the method comprises starting path validation for a user path (e.g., a straight path or line segment, a loop, a curved path or segment, etc.) in relation to a target path. The user path may be generated based on receiving a plurality of user activity data points (e.g., GPS data points) corresponding to a user activity (e.g., mountain biking). In some cases, the system (e.g., system 1000) may assess one or more validation metrics, such as, but not limited to, start/end line validation, buffer zone validation, and progressive checkpoint validation to validate the user path in relation to the target path. In some embodiments, the validation metrics may be customizable by the user, for instance, via a user interface (UI) displayed on the user device.

At Block 902, the method comprises identifying one or more intersections of the user path and the buffer zone, as previously described in relation to FIGS. 6A, 6B, 7, and/or 8. In some cases, the user path and/or the target path crosses the buffer zone at a plurality of intersections. In some embodiments, path validation comprises validating each segment of a plurality of segments along the length of the target path and/or buffer zone, where each segment extends between adjacent intersections. For instance, in FIG. 7, the user path shown in map (2) crosses the buffer zone at a start intersection (left-most cross or "X"), a second intersection, a third intersection, and an end intersection (right-most cross or "X"). In this case, path validation comprises validating each segment (e.g., segment A extending between the first/start intersection and the second intersection; segment B extending between the second intersection and third intersection; and segment C extending between the third intersection and fourth/end intersection; or any consecutive combination of segments A, B, and C) utilizing the one or more validation metrics described herein.

At Block 903, the method comprises evaluating the plurality of segments (e.g., shown as segments A, B, C in FIG. 7) between the start and end intersections for validation. In some cases, the system may calculate a portion of user activity data points contained (e.g., within the buffer zone) for each segment and compare it to a threshold. Additionally, or alternatively, the system determines whether the user path intersects at least a threshold portion of progressive checkpoint lines, where the threshold portion (e.g., percentage, or number) may be defined per segment, or for all segments.

At Block 904 (shown as optional by the dashed lines), the method comprises transmitting a message comprising one of a pass and a fail indication to the user device in response to validating the user path in relation to the target path. For example, the user associated with the user device may be notified (e.g., via a push notification, an email, a text message or SMS, or through any other applicable means) on their status (e.g., pass or fail) once the system, such as system 1000, has validated the user path in relation to the target path. In other cases, the system records the pass or fail indication (e.g., to a user profile or account associated with the user) and may or may not automatically notify the user upon validation of the user path. In some instances, the system may allow the user to modify or edit the notification settings through the user interface (UI) displayed on the user device. For instance, the user may indicate the type of notifications they would like to receive (e.g., only pass, only fail, both pass and fail), what device(s) they would like to receive and/or view the notifications on (e.g., the GPS enabled user device used for tracking/monitoring the user activity, another user device, such as a desktop computer or laptop, etc.), any other notifications or status updates they would like to receive (e.g., portion of progressive checkpoints crossed, portion of user activity data points that are within the buffer zone, etc.), and/or whether they would like to receive automatic notifications. In some embodiments, the system may automatically record information related to the path validation, such as the portion of progressive checkpoints crossed, portion of user activity data points that are within the buffer zone, whether the user path intersects or crosses the start line, the end line, the start circle, and/or the end circle, whether user path was successfully validated in relation to the target path, etc. Furthermore, the system may allow the user to opt out of receiving automatic notifications, in which case the user may be able to view their status (e.g., pass or fail) through a UI displayed on the same or a different user device. Some non-limiting examples of UIs may include a web-based application (or web app), a mobile app, and/or a web page. In other cases, the user may be notified of a pass or fail status through one or more of a text message (e.g., SMS), an email, and/or a social media message (e.g., FACEBOOK message), to name a few non-limiting examples.

Figure 10:
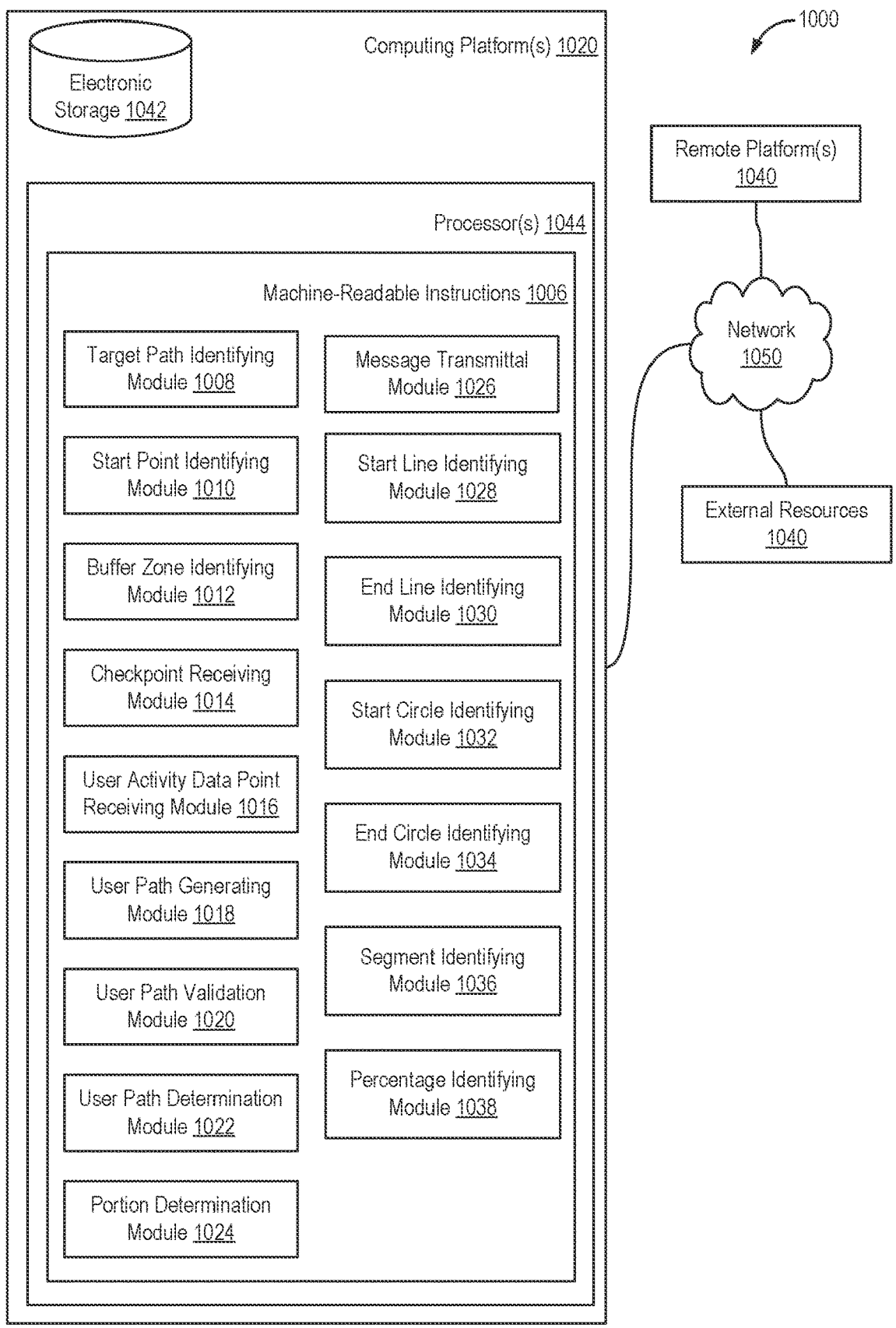
FIG. 10 illustrates an example of a system configured for path validation, according to various aspects of the disclosure.

FIG. 10 illustrates a system 1000 configured for path validation, in accordance with one or more implementations. In some implementations, system 1000 may include one or more computing platforms 1020. Computing platform(s) 1020 may be configured to communicate with one or more remote platforms 1040 according to a client/server architecture, a peer-to-peer architecture, and/or other architectures. Remote platform(s) 1040 may be configured to communicate with other remote platforms via computing platform(s) 1020 and/or according to a client/server architecture, a peer-to-peer architecture, and/or other architectures. Users may access system 1000 via remote platform(s) 1040.

Computing platform(s) 1020 may be configured by machine-readable instructions 1006. Machine-readable instructions 1006 may include one or more instruction modules. The instruction modules may include computer program modules. The instruction modules may include one or more of target path identifying module 1008, start point identifying module 1010, buffer zone identifying module 1012, checkpoint receiving module 1014 (also referred to as progressive checkpoint receiving module 1014), user activity data point receiving module 1016, user path generating module 1018, user path validation module 1020, user path determination module 1022, portion determination module 1024, message transmittal module 1026, start line identifying module 1028, end line identifying module 1030, start circle identifying module 1032, end circle identifying module 1034, segment identifying module 1036, percentage identifying module 1038, and/or other instruction modules.

Target path identifying module 1008 may be configured to identify a target path for an activity. In some embodiments, the target path may include a loop. The target path may be associated with a plurality of satellite-based radionavigation system data points (e.g., GPS data points).

Start point identifying module 1010 may be configured to identify a start point and an end point for the target path. In some implementations, the start point may be located within a start circle, and the end point may be located within an end circle.

Buffer zone identifying module 1012 may be configured to identify a buffer zone. In some embodiments, the buffer zone may surround at least a portion of the target path and includes or intersects one or more of the start point and the end point.

Checkpoint receiving module 1014 may be configured to receive a plurality of progressive checkpoints for the target path. In some cases, the plurality of progressive checkpoints (e.g., progressive checkpoint lines) may be selected based on one or more of the activity and one or more parameters of the target path. By way of non-limiting example, the one or more parameters may include one or more of a length of the target path, a topography of the target path, a net elevation change over the length of the target path, a number of switchbacks over the length of the target path, and a number of other paths that are adjacent or proximate the target path. In some cases, each of the plurality of progressive checkpoints may intersect the target path, and the buffer zone at one or more points.

User activity data point receiving module 1016 may be configured to receive a plurality of user activity data points from a user device. One non-limiting example of a user device includes the remote computing platform 1040. In some cases, the user activity data points may be associated with a user activity. By way of non-limiting example, the user activity may be selected from a group consisting of walking, biking, running, hiking, skiing, snowboarding, swimming, rollerblading, and skateboarding.

User path generating module 1018 may be configured to generate a user path corresponding to the plurality of the user activity data points.

User path validation module 1020 may be configured to validate the user path in relation to the target path. In some cases, the user path validation module 1020 works in conjunction with one or more of the user path determination module 1022, portion determination module 1024, segment identifying module 1036, and/or percentage identifying module 1038 to validate the user path in relation to the target path. In some examples, validating the user path in relation to the target path may be one of dependent and independent of a direction (e.g., forward direction, reverse direction) of the user path.

User path determination module 1022 may be configured to determine whether the user path intersects, or is within a threshold distance of, one or more of the start point and the end point.

User path determination module 1022 may be configured to determine whether the user path intersects at least a threshold number of the plurality of progressive checkpoints (e.g., progressive checkpoint lines).

Portion determination module 1024 may be configured to determine, for the user path, whether a portion of user activity data points that are within the buffer zone is at or above a threshold portion of user activity data points.

Message transmittal module 1026 may be configured to, in response to validating the user path in relation to the target path, transmit a message to the user device. The message may include one of a pass and a fail indication.

Start line identifying module 1028 may be configured to identify a start line for the target path. In some cases, the start line includes (e.g., passes through) the start point.

End line identifying module 1030 may be configured to identify an end line. In some cases, the end line includes (e.g., passes through) the end point.

In some cases, a first buffer may be positioned on one side of the target path, while a second buffer may be positioned on an opposing side of the target path. In some cases, the buffer zone identifying module 1012 is configured to identify the first buffer and the second buffer. By way of non-limiting example, the buffer zone may be defined by the start line, the end line, the first buffer, and the second buffer.

Start circle identifying module 1032 may be configured to identify a start circle. The start circle may include at least a portion of the start line, including the start point.

End circle identifying module 1034 may be configured to identify an end circle. The end circle may include at least a portion of the end line, including the end point.

In some examples, each of the end line, the start circle, and the end circle intersect the buffer zone. By way of non-limiting example, one or more instruction modules of the computing platform 1020 may receive, from the user device (e.g., remote computing platform 1040), one or more of a radius for each of the start circle and the end circle, a length for each of the start line and the end line, a number of the plurality of progressive checkpoints, and a width for the buffer zone. By way of non-limiting example, the radius of the start circle may be equal to or approximately equal (e.g., within 5%, within 10%, within 10 feet, etc.) to the radius of the end circle. Additionally, or alternatively, in some examples, the first buffer and the second buffer of the buffer zone are equidistant or roughly equidistant (e.g., less than 3 feet difference) from the target path. In some embodiments, the start circle and the end circle may intersect or partially overlap.

In some cases, the user path may intersect the buffer zone at one or more intersections. In some cases, at least a portion of the user path may be located outside the buffer zone. Segment identifying module 1036 may be configured to identify, for the user path, one or more segments. The one or more segments may include at least a first segment extending between a first one of the one or more intersections and one of the start point or the end point. Validating the user path in relation to the target path may be further based at least in part on determining, for each of the one or more segments, whether a respective percentage of user activity data points that are within the buffer zone is at or above a buffer intersection threshold.

In some cases, the target path may intersect the buffer zone at a plurality of intersections. Additionally, at least a portion of the target path may be located outside the buffer zone. Segment identifying module 1036 may be configured to identify, for the user path, a plurality of segments to be validated in relation to the target path, including at least a first segment extending between a first intersection and a second intersection of the plurality of intersections, a second segment extending between the second intersection and a third intersection of the plurality of intersections, and a third segment extending between the endpoint and one of the third intersection or a fourth intersection of the plurality of intersections. In some circumstances, at least one segment of the plurality of segments may be located between adjacent progressive checkpoints (e.g., progressive checkpoint lines). In some circumstances, the first intersection may include the start point.

Percentage identifying module 1038 may be configured to identify, for each of the one or more segments, a percentage of user activity data points that are within the buffer zone.

Percentage identifying module 1038 may be configured to identify, for each segment of the plurality of segments, a percentage of user activity data points that are within the buffer zone.

In some implementations, computing platform(s) 1020, remote platform(s) 1040, and/or external resources 1040 may be operatively linked via one or more electronic communication links. For example, such electronic communication links may be established, at least in part, via a network 1050 such as the Internet and/or other networks. It will be appreciated that this is not intended to be limiting, and that the scope of this disclosure includes implementations in which computing platform(s) 1020, remote platform(s) 1040, and/or external resources 1040 may be operatively linked via some other communication media.

A given remote platform 1040 may include one or more processors configured to execute computer program modules. The computer program modules may be configured to enable an expert or user associated with the given remote platform 1040 to interface with system 1000 and/or external resources 1040, and/or provide other functionality attributed herein to remote platform(s) 1040. By way of non-limiting example, a given remote platform 1040 (also referred to as user device 1040) and/or a given computing platform 1020 may include one or more of a server, a desktop computer, a laptop computer, a handheld computer, a tablet computing platform, a NetBook, a Smartphone, a gaming console, and/or other computing platforms.

External resources 1040 may include sources of information outside of system 1000, external entities participating with system 1000, and/or other resources. In some implementations, some or all of the functionality attributed herein to external resources 1040 may be provided by resources included in system 1000.

Computing platform(s) 1020 may include electronic storage 1042, one or more processors 1044, and/or other components. Computing platform(s) 1020 may include communication lines, or ports to enable the exchange of information with the network 1050 and/or other computing platforms. Illustration of computing platform(s) 1020 in FIG. 10 is not intended to be limiting. Computing platform(s) 1020 may include a plurality of hardware, software, and/or firmware components operating together to provide the functionality attributed herein to computing platform(s) 1020. For example, computing platform(s) 1020 may be implemented by a cloud of computing platforms operating together as computing platform(s) 1020.

Electronic storage 1042 may comprise non-transitory storage media that electronically stores information. The electronic storage media of electronic storage 1042 may include one or both of system storage that is provided integrally (i.e., substantially non-removable) with computing platform(s) 1020 and/or removable storage that is removably connectable to computing platform(s) 1020 via, for example, a port (e.g., a USB port, a firewire port, etc.) or a drive (e.g., a disk drive, etc.). Electronic storage 1042 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1042 may include one or more virtual storage resources (e.g., cloud storage, a virtual private network, and/or other virtual storage resources). Electronic storage 1042 may store software algorithms, information determined by processor(s) 1044, information received from computing platform(s) 1020, information received from remote platform(s) 1040, and/or other information that enables computing platform(s) 1020 to function as described herein.

Processor(s) 1044 may be configured to provide information processing capabilities in computing platform(s) 1020. As such, processor(s) 1044 may include one or more of a digital processor, an analog processor, a digital circuit designed to process information, an analog circuit designed to process information, a state machine, and/or other mechanisms for electronically processing information. Although processor(s) 1044 is shown in FIG. 10 as a single entity, this is for illustrative purposes only. In some implementations, processor(s) 1044 may include a plurality of processing units. These processing units may be physically located within the same device, or processor(s) 1044 may represent processing functionality of a plurality of devices operating in coordination. Processor(s) 1044 may be configured to execute modules 1008, 1010, 1012, 1014, 1016, 1018, 1020, 1022, 1024, 1026, 1028, 1030, 1032, 1034, 1036, and/or 1038, and/or other instruction modules. Processor(s) 1044 may be configured to execute modules 1008, 1010, 1012, 1014, 1016, 1018, 1020, 1022, 1024, 1026, 1028, 1030, 1032, 1034, 1036, and/or 1038, and/or other instruction modules by software; hardware; firmware; some combination of software, hardware, and/or firmware; and/or other mechanisms for configuring processing capabilities on processor(s) 1044. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1008, 1010, 1012, 1014, 1016, 1018, 1020, 1022, 1024, 1026, 1028, 1030, 1032, 1034, 1036, and/or 1038 are illustrated in FIG. 10 as being implemented within a single processing unit, in implementations in which processor(s) 1044 includes multiple processing units, one or more of modules 1008, 1010, 1012, 1014, 1016, 1018, 1020, 1022, 1024, 1026, 1028, 1030, 1032, 1034, 1036, and/or 1038 may be implemented remotely from the other modules. The description of the functionality provided by the different modules 1008, 1010, 1012, 1014, 1016, 1018, 1020, 1022, 1024, 1026, 1028, 1030, 1032, 1034, 1036, and/or 1038 described below is for illustrative purposes, and is not intended to be limiting, as any of modules 1008, 1010, 1012, 1014, 1016, 1018, 1020, 1022, 1024, 1026, 1028, 1030, 1032, 1034, 1036, and/or 1038 may provide more or less functionality than is described. For example, one or more of modules 1008, 1010, 1012, 1014, 1016, 1018, 1020, 1022, 1024, 1026, 1028, 1030, 1032, 1034, 1036, and/or 1038 may be eliminated, and some or all of its functionality may be provided by other ones of modules 1008, 1010, 1012, 1014, 1016, 1018, 1020, 1022, 1024, 1026, 1028, 1030, 1032, 1034, 1036, and/or 1038. As another example, processor(s) 1044 may be configured to execute one or more additional modules that may perform some or all of the functionality attributed below to one of modules 1008, 1010, 1012, 1014, 1016, 1018, 1020, 1022, 1024, 1026, 1028, 1030, 1032, 1034, 1036, and/or 1038.

FIGS. 11A, 11B, 11C, 11D, and/or 11E illustrate method(s) 1100 for path validation, in accordance with one or more implementations. The operations of method(s) 1100 presented below are intended to be illustrative. In some implementations, method(s) 1100 may be accomplished with one or more additional operations not described, and/or without one or more of the operations discussed. Additionally, the order in which the operations of method(s) 1100 are illustrated in FIGS. 11A, 11B, 11C, 11D, and/or 11E and described below is not intended to be limiting.

In some implementations, method(s) 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

Figure 11A:
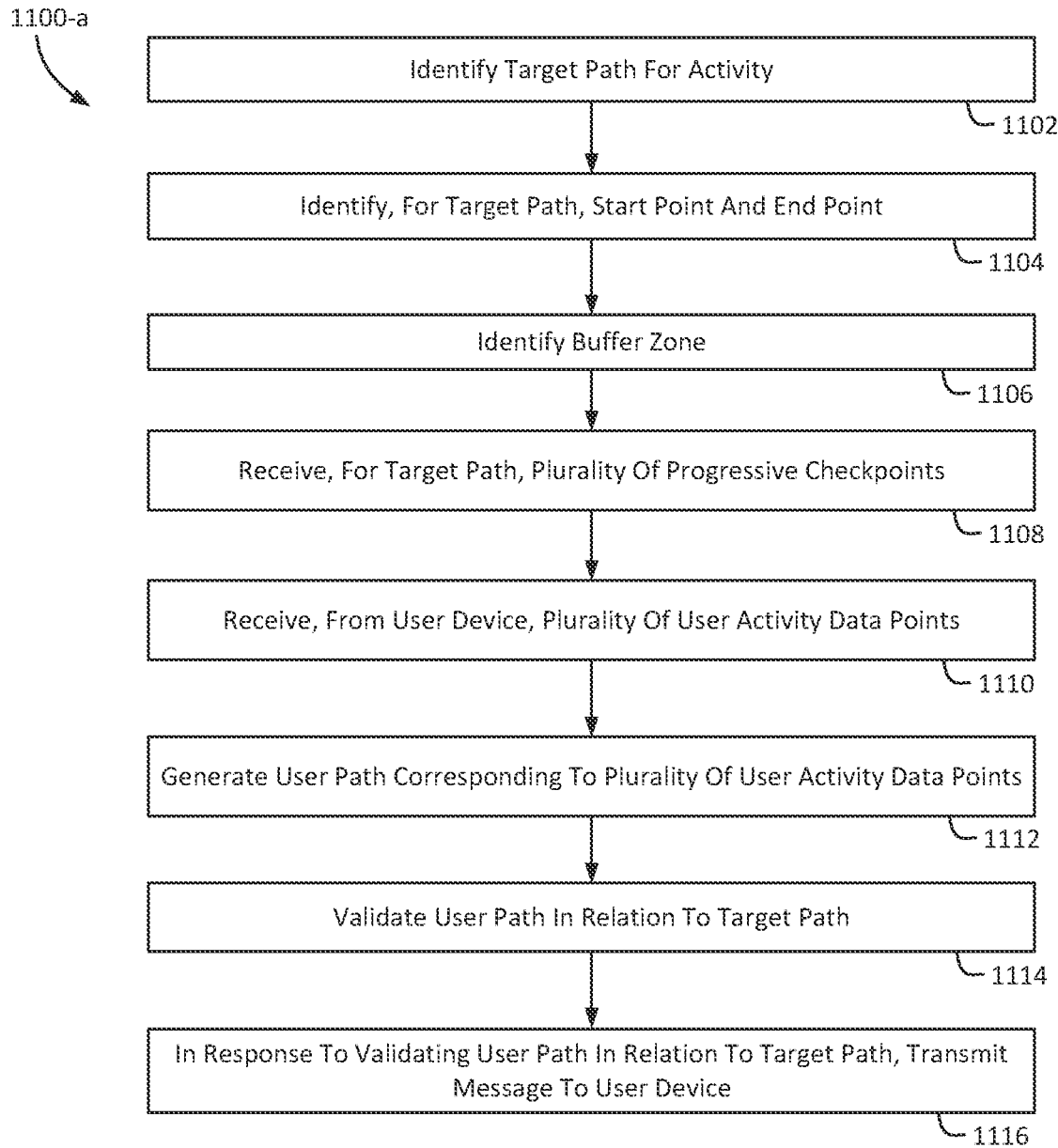
FIG. 11A illustrates a method for path validation, according to various aspects of the disclosure.

FIG. 11A illustrates an example of a method 1100-a for path validation, in accordance with one or more implementations.

A first operation 1102 may include identifying a target path for an activity. The target path may be associated with a plurality of satellite-based radionavigation system data points (e.g., GPS data points). First operation 1102 may be performed by one or more hardware processors configured by machine-readable instructions including a module that is the same as or similar to target path identifying module 1008, in accordance with one or more implementations.

A second operation 1104 may include identifying, for the target path, a start point and an end point. Second operation 1104 may be performed by one or more hardware processors configured by machine-readable instructions including a module that is the same as or similar to start point identifying module 1010, in accordance with one or more implementations.

A third operation 1106 may include identifying a buffer zone. The buffer zone may surround at least a portion of the target path and may include or intersect one or more of the start point and the end point. Third operation 206 may be performed by one or more hardware processors configured by machine-readable instructions including a module that is the same as or similar to buffer zone identifying module 1012, in accordance with one or more implementations.

A fourth operation 1108 may include receiving, for the target path, a plurality of progressive checkpoints. Each of the plurality of progressive checkpoints may intersect the target path, and the buffer zone at one or more points. Fourth operation 1108 may be performed by one or more hardware processors configured by machine-readable instructions including a module that is the same as or similar to checkpoint receiving module 1014, in accordance with one or more implementations.

A fifth operation 1110 may include receiving, from a user device, a plurality of user activity data points, where the plurality of user activity data points may be associated with a user activity. Fifth operation 1110 may be performed by one or more hardware processors configured by machine-readable instructions including a module that is the same as or similar to user activity data point receiving module 1016, in accordance with one or more implementations.

A sixth operation 1112 may include generating a user path corresponding to the plurality of the user activity data points. Sixth operation 1112 may be performed by one or more hardware processors configured by machine-readable instructions including a module that is the same as or similar to user path generating module 1018, in accordance with one or more implementations.

A seventh operation 1114 may include validating the user path in relation to the target path. Validating the user path may include at least in part two or more of (1) determining whether the user path intersects, or is within a threshold distance of, one or more of the start point and the end point, (2) determining whether the user path intersects at least a threshold number of the plurality of progressive checkpoints, and (3) determining, for the user path, whether a portion of user activity data points that are within the buffer zone is at or above a threshold portion of user activity data points. Seventh operation 1114 may be performed by one or more hardware processors configured by machine-readable instructions including one or more modules that are the same as or similar to user path validation module 1020, user path determination module 1022, and/or portion determination module 1024, in accordance with one or more implementations.

An eighth operation 1116 may include in response to validating the user path in relation to the target path, transmitting a message to the user device, where the message includes one of a pass and a fail indication. Eighth operation 1116 may be performed by one or more hardware processors configured by machine-readable instructions including a module that is the same as or similar to message transmittal module 1026, in accordance with one or more implementations.

Figure 11B:
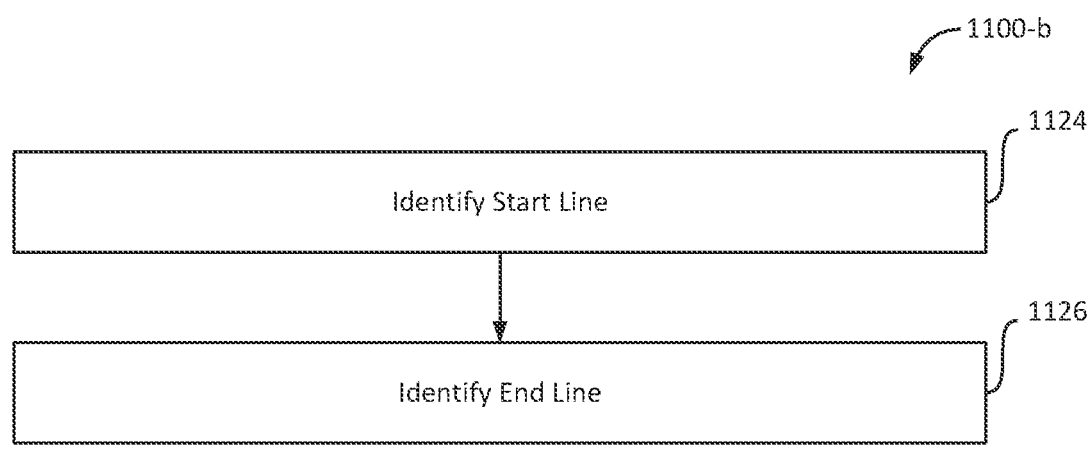
FIG. 11B illustrates a method for path validation, according to various aspects of the disclosure

FIG. 11B illustrates an example of a method 1100-b for path validation, in accordance with one or more implementations.

A first operation 1124 may include identifying a start line. The start line may include the start point. First operation 1124 may be performed by one or more hardware processors configured by machine-readable instructions including a module that is the same as or similar to start line identifying module 1028, in accordance with one or more implementations.

A second operation 1126 may include identifying an end line. The end line may include the end point. Second operation 1126 may be performed by one or more hardware processors configured by machine-readable instructions including a module that is the same as or similar to end line identifying module 1030, in accordance with one or more implementations.

Figure 11C:
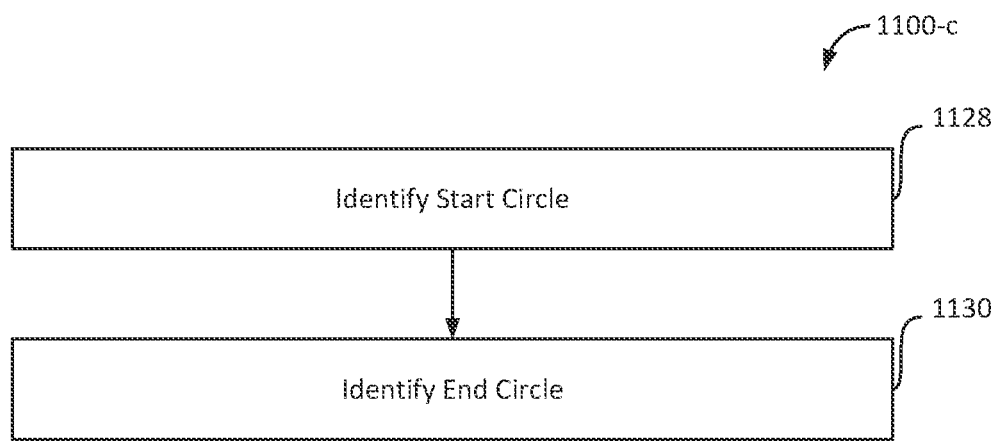
FIG. 11C illustrates a method for path validation, according to various aspects of the disclosure

FIG. 11C illustrates an example of a method 1100-c for path validation, in accordance with one or more implementations.

A first operation 1128 may include identifying a start circle. The start circle may include at least a portion of the start line, including the start point. First operation 1128 may be performed by one or more hardware processors configured by machine-readable instructions including a module that is the same as or similar to start circle identifying module 1032, in accordance with one or more implementations.

A second operation 1130 may include identifying an end circle. The end circle may include at least a portion of the end line, including the end point. Second operation 1130 may be performed by one or more hardware processors configured by machine-readable instructions including a module that is the same as or similar to end circle identifying module 1034, in accordance with one or more implementations.

Figure 11D:
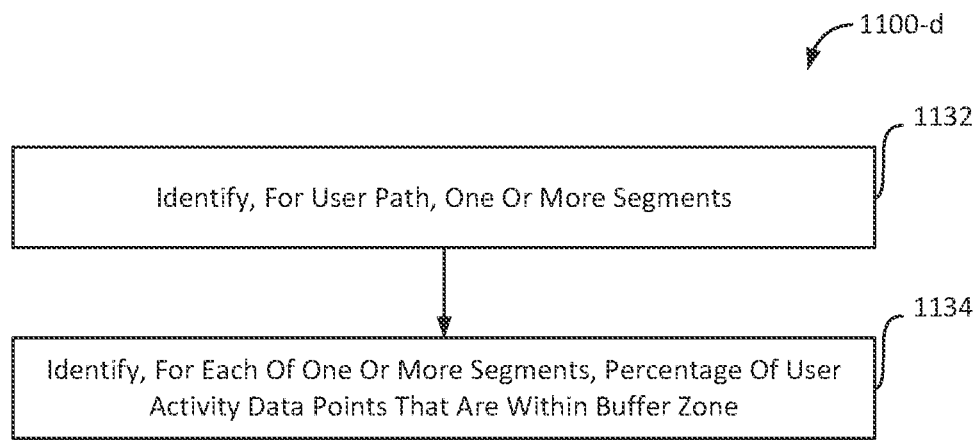
FIG. 11D illustrates a method for path validation, according to various aspects of the disclosure

FIG. 11D illustrates a method 1100-d for path validation, in accordance with one or more implementations.

A first operation 1132 may include identifying, for the user path, one or more segments. The one or more segments may include at least a first segment extending between a first one of the one or more intersections and one of the start point or the end point. First operation 1132 may be performed by one or more hardware processors configured by machine-readable instructions including a module that is the same as or similar to segment identifying module 1036, in accordance with one or more implementations.

A second operation 1134 may include identifying, for each of the one or more segments, a percentage of user activity data points that are within the buffer zone. Second operation 1134 may be performed by one or more hardware processors configured by machine-readable instructions including a module that is the same as or similar to percentage identifying module 1038, in accordance with one or more implementations.

Figure 11E:
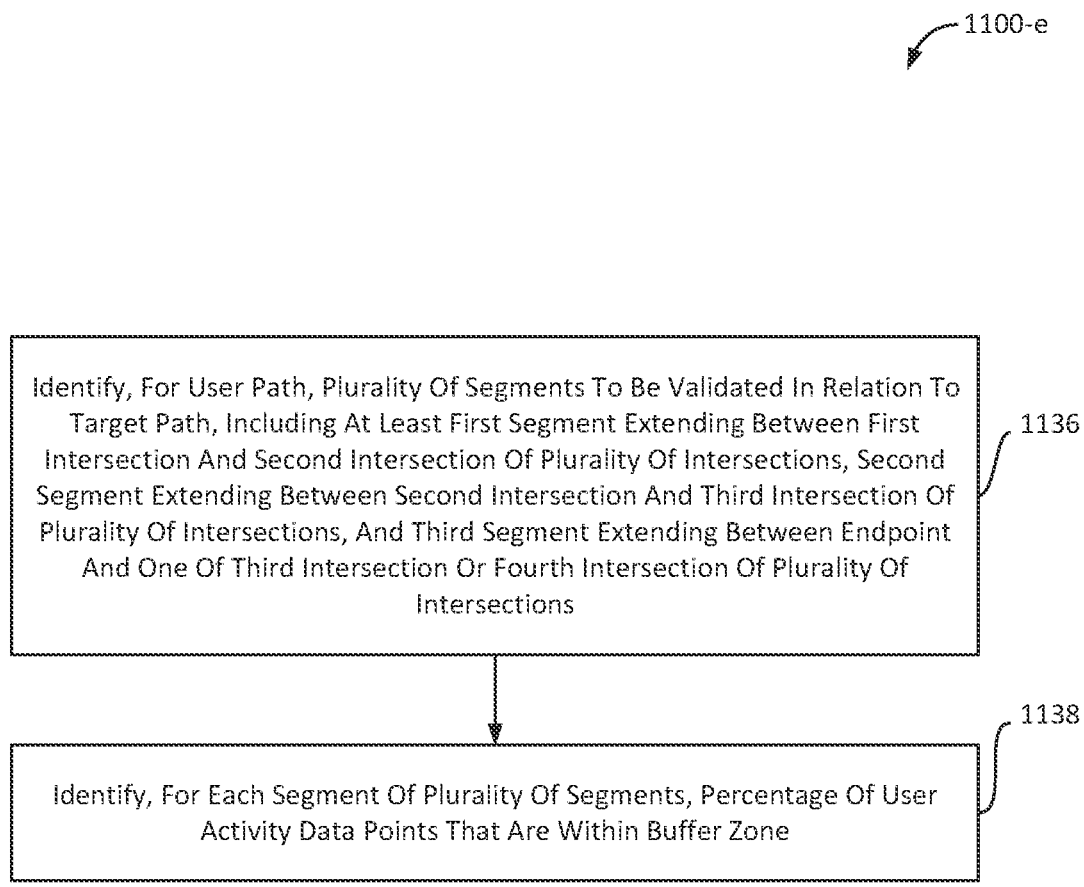
FIG. 11E illustrates a method for path validation, according to various aspects of the disclosure.

FIG. 11E illustrates an example of a method 1100-e for path validation, in accordance with one or more implementations.

A first operation 1136 may include identifying, for the user path, a plurality of segments to be validated in relation to the target path, including at least a first segment extending between a first intersection and a second intersection of the plurality of intersections, a second segment extending between the second intersection and a third intersection of the plurality of intersections, and a third segment extending between the endpoint and one of the third intersection or a fourth intersection of the plurality of intersections. The first intersection may include the start point. First operation 1136 may be performed by one or more hardware processors configured by machine-readable instructions including a module that is the same as or similar to segment identifying module 1036, in accordance with one or more implementations.

A second operation 1138 may include identifying, for each segment of the plurality of segments, a percentage of user activity data points that are within the buffer zone. Second operation 1138 may be performed by one or more hardware processors configured by machine-readable instructions including a module that is the same as or similar to percentage identifying module 1038, in accordance with one or more implementations.

Figure 4:
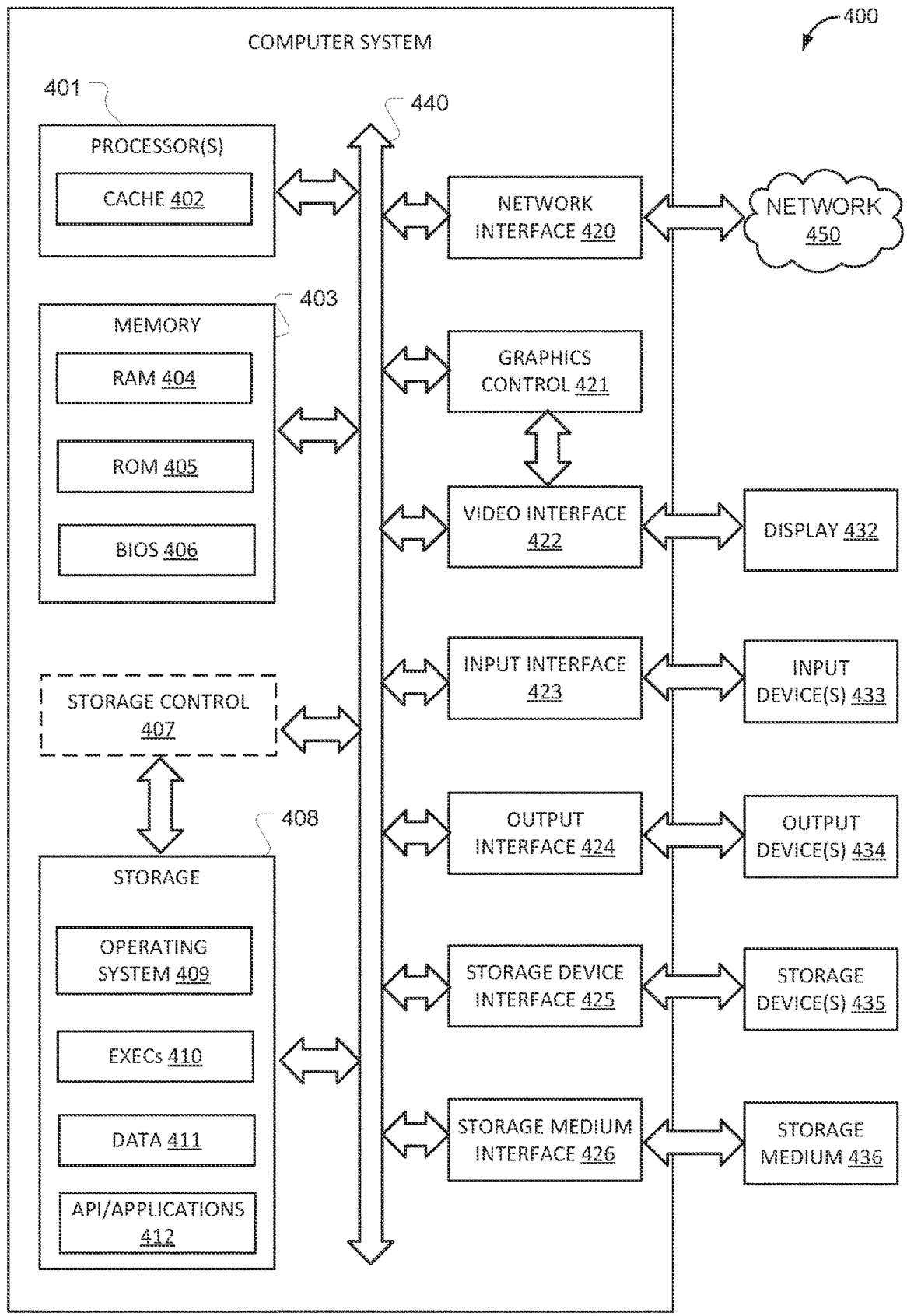
FIG. 4 illustrates a block diagram of a computer system that may be used to implement one or more aspects of the present disclosure.

FIG. 4 illustrates a diagrammatic representation of one embodiment of a computer system 400, within which a set of instructions can execute for causing a device to perform or execute any one or more of the aspects and/or methodologies of the present disclosure. The components in FIG. 4 are examples only and do not limit the scope of use or functionality of any hardware, software, firmware, embedded logic component, or a combination of two or more such components implementing particular embodiments of this disclosure. Some or all of the illustrated components can be part of the computer system 400. For instance, the computer system 400 can be a general-purpose computer (e.g., a laptop computer) or an embedded logic device (e.g., an FPGA), to name just two non-limiting examples.

Moreover, the components may be realized by hardware, firmware, software, or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 400 includes at least a processor 401 such as a central processing unit (CPU) or a graphics processing unit (GPU) to name two non-limiting examples. Any of the subsystems described throughout this disclosure could embody the processor 401. The computer system 400 may also comprise a memory 403 and a storage 408, both communicating with each other, and with other components, via a bus 440. The bus 440 may also link a display 432, one or more input devices 433 (which may, for example, include a keypad, a keyboard, a mouse, a stylus, etc.), one or more output devices 434, one or more storage devices 435, and various non-transitory, tangible computer-readable storage media 436 with each other and/or with one or more of the processor 401, the memory 403, and the storage 408. All of these elements may interface directly or via one or more interfaces or adaptors to the bus 440. For instance, the various non-transitory, tangible computer-readable storage media 436 can interface with the bus 440 via storage medium interface 426. Computer system 400 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 401 (or central processing unit(s) (CPU(s))) optionally contains a cache memory unit 432 for temporary local storage of instructions, data, or computer addresses. Processor(s) 401 are configured to assist in execution of computer-readable instructions stored on at least one non-transitory, tangible computer-readable storage medium. Computer system 400 may provide functionality as a result of the processor(s) 401 executing software embodied in one or more non-transitory, tangible computer-readable storage media, such as memory 403, storage 408, storage devices 435, and/or storage medium 436 (e.g., read only memory (ROM)). Memory 403 may read the software from one or more other non-transitory, tangible computer-readable storage media (such as mass storage device(s) 435, 436) or from one or more other sources through a suitable interface, such as network interface 420. Any of the subsystems herein disclosed could include a network interface such as the network interface 420. The software may cause processor(s) 401 to carry out one or more processes or one or more steps of one or more processes described or illustrated herein. Carrying out such processes or steps may include defining data structures stored in memory 403 and modifying the data structures as directed by the software. In some embodiments, an FPGA can store instructions for carrying out functionality as described in this disclosure. In other embodiments, firmware includes instructions for carrying out functionality as described in this disclosure.

The memory 403 may include various components (e.g., non-transitory, tangible computer-readable storage media) including, but not limited to, a random-access memory component (e.g., RAM 404) (e.g., a static RAM "SRAM", a dynamic RAM "DRAM, etc.), a read-only component (e.g., ROM 405), and any combinations thereof. ROM 405 may act to communicate data and instructions unidirectionally to processor(s) 401, and RAM 404 may act to communicate data and instructions bidirectionally with processor(s) 401. ROM 405 and RAM 404 may include any suitable non-transitory, tangible computer-readable storage media. In some instances, ROM 405 and RAM 404 include non-transitory, tangible computer-readable storage media for carrying out a method. In one example, a basic input/output system 406 (BIOS), including basic routines that help to transfer information between elements within computer system 400, such as during start-up, may be stored in the memory 403.

Fixed storage 408 is connected bi-directionally to processor(s) 401, optionally through storage control unit 407. Fixed storage 408 provides additional data storage capacity and may also include any suitable non-transitory, tangible computer-readable media described herein. Storage 408 may be used to store operating system 409, EXECs 410 (executables), data 411, API applications 412 (application programs), and the like. Often, although not always, storage 408 is a secondary storage medium (such as a hard disk) that is slower than primary storage (e.g., memory 403). Storage 408 can also include an optical disk drive, a solid-state memory device (e.g., flash-based systems), or a combination of any of the above. Information in storage 408 may, in appropriate cases, be incorporated as virtual memory in memory 403.

In one example, storage device(s) 435 may be removably interfaced with computer system 400 (e.g., via an external port connector (not shown)) via a storage device interface 425. Particularly, storage device(s) 435 and an associated machine-readable medium may provide nonvolatile and/or volatile storage of machine-readable instructions, data structures, program modules, and/or other data for the computer system 400. In one example, software may reside, completely or partially, within a machine-readable medium on storage device(s) 435. In another example, software may reside, completely or partially, within processor(s) 401.

Bus 440 connects a wide variety of subsystems. Herein, reference to a bus may encompass one or more digital signal lines serving a common function, where appropriate. Bus 440 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof Computer system 400 may also include an input device 433. In one example, a user of computer system 400 may enter commands and/or other information into computer system 400 via input device(s) 433. Examples of an input device(s) 433 include, but are not limited to, an alphanumeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 433 may be interfaced to bus 440 via any of a variety of input interfaces 423 (e.g., input interface 423) including, but not limited to, serial, parallel, game port, USB, FIREWIRE, THUNDERBOLT, or any combination of the above.

In particular embodiments, when computer system 400 is connected to network 450, computer system 400 may communicate with other devices, such as mobile devices and enterprise systems, connected to network 450. Communications to and from computer system 400 may be sent through network interface 420. For example, network interface 420 may receive incoming communications (such as requests or responses from other devices) in the form of one or more packets (such as Internet Protocol (IP) packets) from network 450, and computer system 400 may store the incoming communications in memory 403 for processing. Computer system 400 may similarly store outgoing communications (such as requests or responses to other devices) in the form of one or more packets in memory 403 and communicated to network 450 from network interface 420. Processor(s) 401 may access these communication packets stored in memory 403 for processing.

Examples of the network interface 420 include, but are not limited to, a network interface card, a modem, and any combination thereof. Examples of a network 450 or network segment 450 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 450, may employ a wired and/or a wireless mode of communication. In general, any network topology may be used.

Information and data can be displayed through a display 432. Examples of a display 432 include, but are not limited to, a liquid crystal display (LCD), an organic liquid crystal display (OLED), a cathode ray tube (CRT), a plasma display, and any combinations thereof. The display 432 can interface to the processor(s) 401, memory 403, and fixed storage 408, as well as other devices, such as input device(s) 433, via the bus 440. The display 432 is linked to the bus 440 via a video interface 422, and transport of data between the display 432 and the bus 440 can be controlled via the graphics control 421.

In addition to a display 432, computer system 400 may include one or more other peripheral output devices 434 including, but not limited to, an audio speaker, a printer, and any combinations thereof. Such peripheral output devices may be connected to the bus 440 via an output interface 424. Examples of an output interface 424 include, but are not limited to, a serial port, a parallel connection, a USB port, a FIREWIRE port, a THUNDERBOLT port, and any combinations thereof.

In addition, or as an alternative, computer system 400 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an integrated circuit or IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 400 shown in FIG. 4 such as, but not limited to, the network 450, processor 401, memory, 403, etc., may comprise a cloud computing system. In one such system, front-end systems such as input devices 433 may provide information to back-end platforms such as servers (e.g., computer systems 400) and storage (e.g., memory 403). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for path validation, the system comprising one or more hardware processors configured by machine-readable instructions to:

identify a target path for a user activity, wherein the target path is associated with a plurality of satellite-based radionavigation system data points, and wherein each of the satellite-based radionavigation system data points comprises an associated Global Positioning System (GPS) coordinate;

identify, for the target path, a start point and an end point;

identify a buffer zone, wherein the buffer zone surrounds at least a portion of the target path, and comprises or intersects one or more of the start point and the end point;

receive, for the target path, a plurality of progressive checkpoints, wherein each of the plurality of progressive checkpoints intersect the target path, and the buffer zone at one or more points;

receive, from a GPS-enabled user device, a plurality of user activity data points, wherein the plurality of user activity data points are associated with the user activity, and wherein each of the plurality of user activity data points comprises an associated GPS coordinate;

generate a user path corresponding to the plurality of the user activity data points, wherein generating the user path comprises displaying the user path and at least a portion of the target path on a user interface (UI) of the GPS-enabled user device;

validate the user path in relation to the target path, wherein validating the user path comprises comparing the GPS coordinates associated with the user path to the GPS coordinates associated with the target path within the buffer zone for determining at least in part, two or more of:

whether the user path intersects, or is within a threshold distance of, one or more of the start point and the end point, whether the user path intersects at least a threshold number of the plurality of progressive checkpoints, and whether a portion of user activity data points of the user path that are within the buffer zone is at or above a threshold portion of user activity data points; and in response to validating the user path in relation to the target path, recording information pertaining to the validation, wherein the information includes one of a pass and a fail indication, and one or more of:

receiving a request for accessing the information pertaining to the validation; and transmitting a message to the GPS-enabled user device, wherein the message includes the information pertaining to the validation.

2. The system of claim 1, wherein the one or more hardware processors are further configured by machine-readable instructions to:

identify a start line, wherein the start line comprises the start point; and identify an end line, wherein the end line comprises the end point, and wherein each of the start line and the end line are defined by a plurality of GPS coordinates.

3. The system of claim 2, wherein the one or more hardware processors are further configured by machine-readable instructions to:

identify a start circle, wherein the start circle comprises at least a portion of the start line, including the start point;
identify an end circle; wherein,
the end circle comprises at least a portion of the end line, including the end point; and
each of the start line, the end line, the start circle, and the end circle intersect the buffer zone.

4. The system of claim 3, wherein identifying, for the target path, one or more of the start line, the end line, the start circle, the end circle, the plurality of progressive checkpoints, and the buffer zone comprises receiving, from the user device, one or more of:
a radius for each of the start circle and the end circle;
a length for each of the start line and the end line;
a number of the plurality of progressive checkpoints; and
a width for the buffer zone.

5. The system of claim 4, wherein, the buffer zone is defined by the start line, the end line, a first buffer, and a second buffer;
the first buffer is positioned on one side of the target path;
the second buffer is positioned on an opposing side of the target path; and
the radius of the start circle is equal to or approximately equal to the radius of the end circle; and
wherein validating the user path in relation to the target path further comprises:
determining whether the user path intersects one or more of the start line, the start circle, the end line, and the end circle.

6. A method for path validation, the method comprising:
identifying a target path for a user activity, wherein the target path is associated with a plurality of satellite-based radionavigation system data points, and wherein each of the satellite-based radionavigation system data points comprises an associated Global Positioning System (GPS) coordinate;
identifying, for the target path, a start point and an end point;
identifying a buffer zone, wherein the buffer zone surrounds at least a portion of the target path, and comprises or intersects one or more of the start point and the end point;
receiving, for the target path, a plurality of progressive checkpoints, wherein each of the plurality of progressive checkpoints intersect the target path, and the buffer zone at one or more points;
receiving, from a GPS-enabled user device, a plurality of user activity data points, wherein the plurality of user activity data points are associated with the user activity, and wherein each of the plurality of user activity data points comprises an associated GPS coordinate;
generating a user path corresponding to the plurality of the user activity data points, wherein generating the user path comprises displaying the user path and at least a portion of the target path on a user interface (UI) of the GPS-enabled user device;
validating the user path in relation to the target path, wherein validating the user path comprises comparing the GPS coordinates associated with the user path to the GPS coordinates associated with the target path within the buffer zone for determining at least in part, two or more of:
whether the user path intersects, or is within a threshold distance of, one or more of the start point and the end point,
whether the user path intersects at least a threshold number of the plurality of progressive checkpoints, and
whether a portion of user activity data points of the user path that are within the buffer zone is at or above a threshold portion of user activity data points; and
in response to validating the user path in relation to the target path, recording information pertaining to the validation, wherein the information includes one of a pass and a fail indication, and one or more of:
receiving a request for accessing the information pertaining to the validation; and
transmitting a message to the GPS-enabled user device, wherein the message includes the information pertaining to the validation.

7. The method of claim 6, wherein transmitting the message comprises one or more of:
transmitting the message to the GPS-enabled user device, based at least in part on receiving the request for accessing information pertaining to the validation;
automatically transmitting one or more of a text message, an email, and a social media message to the GPS-enabled user device; and
automatically transmitting a push notification to the GPS-enabled user device.

8. The method of claim 6, further comprising:
identifying a start line, wherein the start line comprises the start point; and
identifying an end line, wherein the end line comprises the end point, and wherein each of the start line and the end line are defined by a plurality of GPS coordinates.

9. The method of claim 8, further comprising:
identifying a start circle, wherein the start circle comprises at least a portion of the start line, including the start point; and
identifying an end circle, wherein the end circle comprises at least a portion of the end line, including the end point;
wherein each of the start line, the end line, the start circle, and the end circle intersect the buffer zone.

10. The method of claim 9, wherein identifying, for the target path, one or more of the start line, the end line, the start circle, the end circle, the plurality of progressive checkpoints, and the buffer zone comprises receiving, from the GPS-enabled user device, one or more of:
a radius for each of the start circle and the end circle;
a length for each of the start line and the end line;
a number of the plurality of progressive checkpoints; and
a width for the buffer zone.

11. The method of claim 10, wherein,
the buffer zone is defined by the start line, the end line, a first buffer, and a second buffer;
the first buffer is positioned on one side of the target path;
the second buffer is positioned on an opposing side of the target path; and
the radius of the start circle is equal to or approximately equal to the radius of the end circle;
and wherein validating the user path in relation to the target path further comprises:
determining whether the user path intersects one or more of the start line, the start circle, the end line, and the end circle.

12. The method of claim 6, wherein
the plurality of progressive checkpoints are selected based on one or more of the user activity and one or more parameters of the target path; and the one or more parameters comprise one or more of:
- a length of the target path,
- a topography of the target path,
- a net elevation change over the length of the target path,
- a number of switchbacks over the length of the target path, and
- a number of other paths that are adjacent or proximate the target path.

13. The method of claim 6, wherein,
the target path comprises a loop;
the start point is located within a start circle;
the end point is located within an end circle; and
the start circle and the end circle intersect or partially overlap.

14. The method of claim 6, wherein, the user path intersects the buffer zone at one or more intersections, and wherein at least a portion of the user path is outside the buffer zone, the method further comprising:
identifying, for the user path, one or more segments, the one or more segments including at least a first segment extending between a first one of the one or more intersections and one of the start point or the end point; and
identifying, for each of the one or more segments, a percentage of user activity data points that are within the buffer zone.

15. The method of claim 14, wherein validating the user path in relation to the target path is further based at least in part on determining, for each of the one or more segments, whether a respective percentage of user activity data points that are within the buffer zone is at or above a buffer intersection threshold.

16. The method of claim 6, wherein the target path intersects the buffer zone at a plurality of intersections, and wherein at least a portion of the target path is outside the buffer zone, the method further comprising:
identifying, for the user path, a plurality of segments to be validated in relation to the target path, including at least,
a first segment extending between a first intersection and a second intersection of the plurality of intersections, wherein the first intersection comprises the start point,
a second segment extending between the second intersection and a third intersection of the plurality of intersections, and
a third segment extending between the endpoint and one of the third intersection or a fourth intersection of the plurality of intersections; and
identifying, for each segment of the plurality of segments, a percentage of user activity data points that are within the buffer zone.

17. The method of claim 16, wherein at least one segment of the plurality of segments is located between adjacent progressive checkpoints.

18. The method of claim 6, wherein validating the user path in relation to the target path is one of dependent and independent of a direction of the user path.

19. The method of claim 6, wherein the user activity is selected from a group consisting of walking, biking, running, hiking, skiing, snowboarding, swimming, rollerblading, horseback riding, jet skiing, snowmobiling, go karting, and skateboarding.

* * * * *